United States Patent [19]
Diaz et al.

[11] Patent Number: 5,526,349
[45] Date of Patent: Jun. 11, 1996

[54] DATA FORMATS FOR TELECOMMUNICATIONS NETWORKS

[75] Inventors: Felix V. Diaz, Plano; Raymond L. Hogg, Carrollton; Daniel J. Raz, Plano; Kathy A. Thompson, Garland; Gregory L. Langdon, Addison; W. Keith Brewer, Richardson, all of Tex.

[73] Assignee: DSC Communications Corporation, Plano, Tex.

[21] Appl. No.: 356,445

[22] Filed: Dec. 13, 1994

Related U.S. Application Data

[62] Division of Ser. No. 228,304, Apr. 15, 1994.

[51] Int. Cl.⁶ .................................................. H04L 12/40
[52] U.S. Cl. ..................... 370/58.1; 370/60.1; 370/79; 370/85.1; 370/94.2; 370/99; 370/110.1
[58] Field of Search .......................... 370/53, 58.1, 58.2, 370/58.3, 60, 60.1, 67, 79, 85.1, 85.2, 85.3, 85.4, 85.5, 85.6, 94.1, 94.2, 99, 110.1

[56] References Cited

U.S. PATENT DOCUMENTS

| | | | |
|---|---|---|---|
| 4,538,263 | 8/1985 | Gabrielli | 370/86 |
| 4,761,781 | 8/1988 | Calvignac et al. | 370/94 |
| 4,862,451 | 8/1989 | Closs et al. | 370/60 |
| 4,881,230 | 11/1989 | Clark et al. | 371/20.1 |
| 4,894,823 | 1/1990 | Adelmann et al. | 370/60 |
| 4,999,832 | 3/1991 | Chen et al. | 370/85.15 X |
| 5,040,170 | 8/1991 | Upp et al. | 370/99 X |
| 5,140,587 | 8/1992 | Mueller et al. | 370/85.15 |
| 5,173,901 | 12/1992 | DeSomer | 370/112 |
| 5,235,594 | 8/1993 | Lee | 370/85.9 |
| 5,301,185 | 4/1994 | Cherry | 370/85.15 X |
| 5,353,282 | 10/1994 | Dormer et al. | 370/58.1 |
| 5,355,362 | 10/1994 | Gorshe et al. | 370/85.15 X |
| 5,390,173 | 2/1995 | Spinney et al. | 370/60 |

*Primary Examiner*—Douglas W. Olms
*Assistant Examiner*—Russell W. Blum
*Attorney, Agent, or Firm*—Baker & Botts

[57] ABSTRACT

Three data formats for telecommunication networks are provided. One format is an asynchronous packet bus overlay datagram format (122) constructed to include an internal datagram header (140) and a datagram payload (141) concatenated with the internal datagram header. The internal datagram header comprises a destination address (146), a weighted age (152), and a source address (14). A second format is a wideband bus overlay format (126) comprising three header octets and a plurality of payload octets such that the data is formatted into one of a plurality of industry standard isochronous wideband data formats. A third format is a narrow band bus overlay format (124) comprising a plurality of signaling octets, a plurality of octets concatenated with the first plurality of signaling octets to hold data, and a common system multiframe structure.

9 Claims, 14 Drawing Sheets

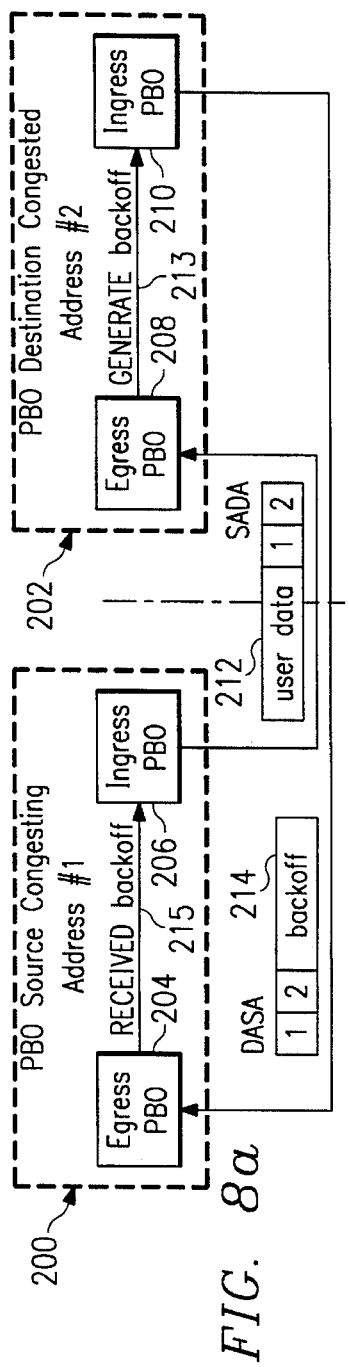
FIG. 8a
FIG. 8b
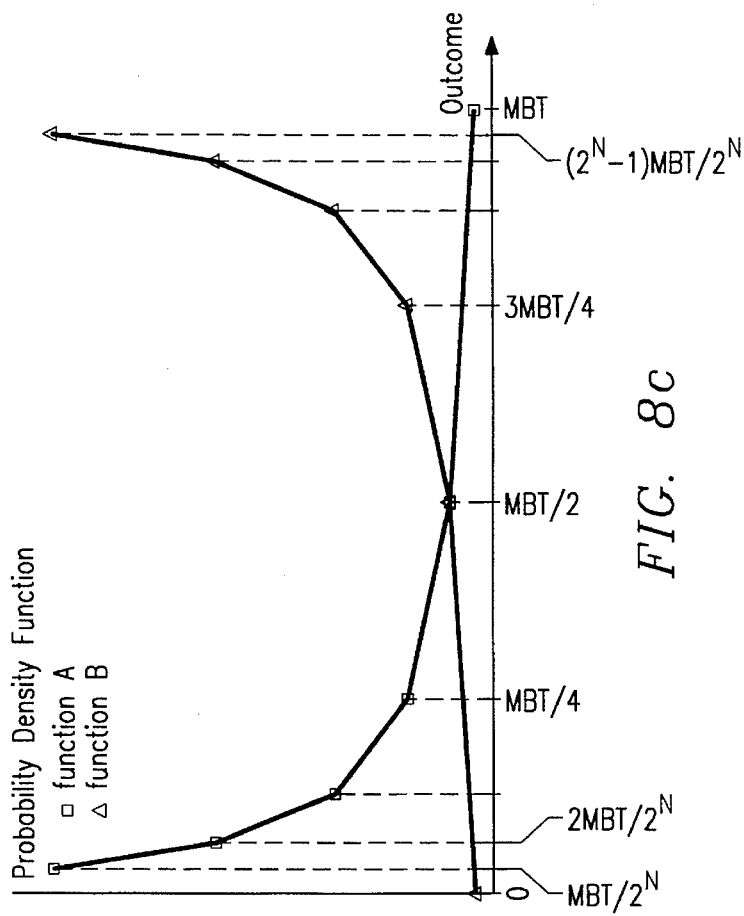
FIG. 8c

WIDEBAND BUS OVERLAY PAYLOAD ENVELOPE

WIDEBAND BUS OVERLAY FORMAT

FIG. 10a

T1 Structure

| | |
|---|---|
| octet 0 | Sa Sb Sc Sd x x x F |
| octet 24 | channels 1 – 24 |

Sa – Sd = Signaling Bits
F = T1 Framing Bit
x = unused bits

E1 Structure

| | |
|---|---|
| octet 0 | Sa Sb Sc Sd Sa Sb Sc Sd |
| | timeslots 0 – 15 |
| octet 31 | timeslots 17 – 31 |

FIG. 10b

| Multiframe Channel | D4 Signaling<br>Sa Sb Sc Sd | ESF Signaling<br>Sa Sb Sc Sd | E1 Signaling<br>Sa Sb Sc Sd Sa Sb Sc Sd |
|---|---|---|---|
| 1 | $a_{1a} b_{1a} a_{1b} b_{1b}$ | $a_1 b_1 c_1 d_1$ | 0 0 0 0 x y x x |
| 2 | $a_{2a} b_{2a} a_{2b} b_{2b}$ | $a_2 b_2 c_2 d_2$ | $a_1 b_1 c_1 d_1 a_{17} b_{17} c_{17} d_{17}$ |
| ⋮ | ⋮ | ⋮ | ⋮ |
| 12 | $a_{12a} b_{12a} a_{12b} b_{12b}$ | $a_{12} b_{12} c_{12} d_{12}$ | $a_{11} b_{11} c_{11} d_{11} a_{27} b_{27} c_{27} d_{27}$ |
| 13 | $a_{13a} b_{13a} a_{13b} b_{13b}$ | $a_{13} b_{13} c_{13} d_{13}$ | $a_{12} b_{12} c_{12} d_{12} a_{28} b_{28} c_{28} d_{28}$ |
| ⋮ | ⋮ | ⋮ | ⋮ |
| 16 | $a_{16a} b_{16a} a_{16b} b_{16b}$ | $a_{16} b_{16} a_{16} b_{16}$ | $a_{15} b_{15} c_{15} d_{15} a_{31} b_{31} c_{31} d_{31}$ |
| 17 | $a_{17a} b_{17a} a_{17b} b_{17b}$ | $a_{17} b_{17} a_{17} b_{17}$ | 0 0 0 0 x y x x |
| 18 | $a_{18a} b_{18a} a_{18b} b_{18b}$ | $a_{18} b_{18} a_{18} b_{18}$ | $a_1 b_1 c_1 d_1 a_{17} b_{17} c_{17} d_{17}$ |
| ⋮ | ⋮ | ⋮ | ⋮ |
| 24 | $a_{24a} b_{24a} a_{24b} b_{24b}$ | $a_{24} b_{24} c_{24} d_{24}$ | $a_7 b_7 c_7 d_7 a_{23} b_{23} c_{23} d_{23}$ |
| 25 | $a_{1a} b_{1a} a_{1b} b_{1b}$ | $a_1 b_1 c_1 d_1$ | $a_8 b_8 c_8 d_8 a_{24} b_{24} c_{24} d_{24}$ |
| ⋮ | ⋮ | ⋮ | ⋮ |
| 32 | $a_{8a} b_{8a} a_{8b} b_{8b}$ | $a_8 b_8 a_8 b_8$ | $a_{15} b_{15} c_{15} d_{15} a_{31} b_{31} c_{31} d_{31}$ |
| 33 | $a_{9a} b_{9a} a_{9b} b_{9b}$ | $a_9 b_9 a_9 b_9$ | 0 0 0 0 x y x x |
| ⋮ | ⋮ | ⋮ | ⋮ |
| 47 | $a_{23a} b_{23a} a_{23b} b_{23b}$ | $a_{23} b_{23} c_{23} d_{23}$ | $a_{14} b_{14} c_{14} d_{14} a_{30} b_{30} c_{30} d_{30}$ |
| 48 | $a_{24a} b_{24a} a_{24b} b_{24b}$ | $a_{24} b_{24} c_{24} d_{24}$ | $a_{15} b_{15} c_{15} d_{15} a_{31} b_{31} c_{31} d_{31}$ |

FIG. 10c

| T1 Structure |
|---|
| $S_{a6}$ $S_{b6}$ $S_{c6}$ $S_{d6}$ $S_{a7}$ $S_{b7}$ $S_{c7}$ $S_{d7}$ |
| $S_{a4}$ $S_{b4}$ $S_{c4}$ $S_{d4}$ $S_{a5}$ $S_{b5}$ $S_{c5}$ $S_{d5}$ |
| $S_{a2}$ $S_{b2}$ $S_{c2}$ $S_{d2}$ $S_{a3}$ $S_{b3}$ $S_{c3}$ $S_{d3}$ |
| $S_{a0}$ $S_{b0}$ $S_{c0}$ $S_{d0}$ $S_{a1}$ $S_{b1}$ $S_{c1}$ $S_{d1}$ |
| channels 1 – 24 |

| E1 Structure |
|---|
| $S_{a6}$ $S_{b6}$ $S_{c6}$ $S_{d6}$ $S_{a7}$ $S_{b7}$ $S_{c7}$ $S_{d7}$ |
| $S_{a4}$ $S_{b4}$ $S_{c4}$ $S_{d4}$ $S_{a5}$ $S_{b5}$ $S_{c5}$ $S_{d5}$ |
| $S_{a2}$ $S_{b2}$ $S_{c2}$ $S_{d2}$ $S_{a3}$ $S_{b3}$ $S_{c3}$ $S_{d3}$ |
| $S_{a0}$ $S_{b0}$ $S_{c0}$ $S_{d0}$ $S_{a1}$ $S_{b1}$ $S_{c1}$ $S_{d1}$ |
| timeslots 0 – 15<br>timeslots 17 – 31 |

FIG. 10d

| Compression Type | No. of Sig. bytes |
|---|---|
| 32 kbps | 1 |
| 24 kbps | 1 |
| 16 kbps | 2 |
| 8 kbps | 4 |

FIG. 10e

| Multiframe Channel | T1 Signaling DS0 Number | E1 Signaling DS0 Number | E1 Signaling G.761 |
|---|---|---|---|
| 1 | 1 | x | 0 0 0 0 x y x x |
| 2 | 2 | 1,2 | $a_{1a} b_{1a} a_{2a} b_{2a} a_{15b} b_{15b} a_{16b} b_{16b}$ |
| 3 | 3 | 3,4 | $a_{1b} b_{1b} a_{2b} b_{2b} a_{17a} b_{17a} a_{18a} b_{18a}$ |
| ⋮ | ⋮ | ⋮ | ⋮ |
| 16 | 16 | 30,31 | $a_{15a} b_{15a} a_{16a} b_{16a} a_{29b} b_{29b} a_{30b} b_{30b}$ |
| 17 | 17 | x | 0 0 0 0 x y x x |
| 18 | 18 | 1,2 | $a_{1a} b_{1a} a_{2a} b_{2a} a_{15b} b_{15b} a_{16b} b_{16b}$ |
| ⋮ | ⋮ | ⋮ | ⋮ |
| 24 | 24 | 13,14 | $a_{7a} b_{7a} a_{8a} b_{8a} a_{21b} b_{21b} a_{22b} b_{22b}$ |
| 25 | 1 | 15,17 | $a_{7b} b_{7b} a_{8b} b_{8b} a_{23a} b_{23a} a_{24a} b_{24a}$ |
| ⋮ | ⋮ | ⋮ | ⋮ |
| 32 | 8 | 30,31 | $a_{15a} b_{15a} a_{16a} b_{16a} a_{29b} b_{29b} a_{30b} b_{30b}$ |
| 33 | 9 | x | 0 0 0 0 x y x x |
| ⋮ | ⋮ | ⋮ | ⋮ |
| 47 | 23 | 28,29 | $a_{13b} b_{13b} a_{14b} b_{14b} a_{29a} b_{29a} a_{30a} b_{30a}$ |
| 48 | 24 | 30,31 | $a_{15a} b_{15a} a_{16a} b_{16a} a_{29b} b_{29b} a_{30b} b_{30b}$ | x = unused

DATA FORMATS FOR TELECOMMUNICATIONS NETWORKS

CROSS REFERENCE TO RELATED APPLICATIONS

This application is a divisional application of U.S. application Ser. No. 08/228,304, filed Apr. 15, 1994 and entitled "Multi-Service Switch for a Telecommunications Network", pending.

TECHNICAL FIELD OF THE INVENTION

This invention relates in general to the field of telecommunications networks, and more particularly to a multi-service switch for a telecommunications network.

BACKGROUND OF THE INVENTION

A telecommunications environment includes two or more entities that are interconnected and communicate through various telecommunications services. The entities are interconnected to allow communication of information back and forth. Telecommunications networks provide the means for communication of voice, video, facsimile or computer data information between separate entities connected to the networks. A particular telecommunications network may provide support for one or more of these types of telecommunications information.

In many telecommunications networks, the interconnections between entities are implemented by a bus connecting the entities. Generally, buses may be time multiplexed such that the data stream passing along the bus is divided into time slots, and information from one entity to another is transmitted in these discrete time slots. The telecommunications information transmitted between entities breaks down into two broad types of services, namely asynchronous and isochronous services. Isochronous services require predictable periodic access to a network bus. Asynchronous services by contrast are all those that support bursty information types such as, for instance, packet services or asynchronous transfer mode (ATM) circuit emulation. Many bus implementations are dedicated solely to one of these two types of services.

There do exist some bus structures that support transmission of both isochronous and asynchronous service formats. For example, some ring bus structures, such as a slotted ring, dedicate some bus time slots to isochronous and some bus time slots to asynchronous service formats. Other non-ring bus structures also dedicate each bus time slot to either isochronous or asynchronous service formats. In both the ring bus structures and non-ring bus structures, a control message must be sent to each entity on the network to change the map of the bus time slots. This causes disruption of communication while administration overhead processes the mapping change.

SUMMARY OF THE INVENTION

Therefore, a need has arisen for a multi-service switch for a telecommunications network that provides flexible support for all forms of telecommunications information services.

In accordance with the present invention, a multi-service switch for a telecommunications network is provided that substantially eliminates or reduces disadvantages and problems associated with prior switches.

According to one embodiment of the present invention, a multi-service switch for a telecommunications network is provided. A system bus has an ingress portion and an egress portion. The system bus is operable to carry data in a plurality of time slots. A system bus control comprises a head-of-bus control having an output. The output of the head-of-bus control is coupled to the ingress portion of the system bus. The head-of-bus control is operable to configure and control the plurality of time slots. The system bus control also comprises a tail-of-bus control coupled to the head-of-bus control. The tail-of-bus control has an input coupled to the egress portion of the system bus. The tail-of-bus control is operable to receive data from the egress portion of the system bus. A plurality of interface modules each have an input and an output. The input of each interface module is coupled to the egress portion of the system bus, and the output of each interface module is coupled to the ingress portion of the system bus. Each interface module is operable to perform distributed switching to communicate telecommunications information on the system bus. An ingress/egress bridge has an input and an output. The input of the ingress/egress bridge is coupled to the ingress portion of the system bus, and the output of the ingress/egress bridge is coupled to the egress portion of the system bus. The ingress/egress bridge is operable to bridge the ingress portion to the egress portion of the system bus.

A technical advantage of the present invention is the configuration of a bus in a telecommunications network to support a plurality of types of telecommunications services having unique data formats.

Another technical advantage of the present invention is the dynamic allocation of time slots on a bus between isochronous services and asynchronous services with no disruption in data transmission.

Another technical advantage of the present invention is the interworking of different service types, that is, the transformation of telecommunications information received in a first format to a second format for transmission in the second format to other entities in the network.

Another technical advantage of the present invention is the transformation of all telecommunications information into one of a plurality of data formats for transmission on a single physical bus in a telecommunications network services platform.

BRIEF DESCRIPTION OF THE DRAWINGS

A more complete understanding of the present invention may be acquired by referring to the following description taken on conjunction with the accompanying drawings, in which like reference numbers indicate like features and wherein:

FIG. 8a illustrates a block diagram of a backoff protocol according to the teachings of the present invention;

FIG. 8b illustrates a backoff message format according to the teachings of the present invention;

FIG. 8c illustrates a probability density function of backoff times according to one embodiment of the present invention;

FIG. 10a illustrates an isochronous narrowband bus overlay data format according to the teachings of the present invention;

FIG. 10b illustrates a narrowband structure of a signaling multiframe for trunks not carrying compressed voice data;

FIG. 10c illustrates an isochronous narrowband bus overlay data format for compressed voice channels according to the teachings of the present invention;

FIG. 10d illustrates the number of signaling bytes needed for various compression schemes; and FIG. 10e illustrates a mapping of compressed channel signaling to the system multiframe according to the teachings of the present invention.

DETAILED DESCRIPTION OF THE INVENTION

A multi-service switch for a telecommunications network constructed according to the teachings of the present invention provides a single integrated platform that facilitates the provision of a variety of telecommunications information services to diverse entities simultaneously. The multi-service switch of the present invention specifically supports both isochronous services and asynchronous services using a single physical bus.

Block Diagram of Multi-Service Switch

Figure 1:
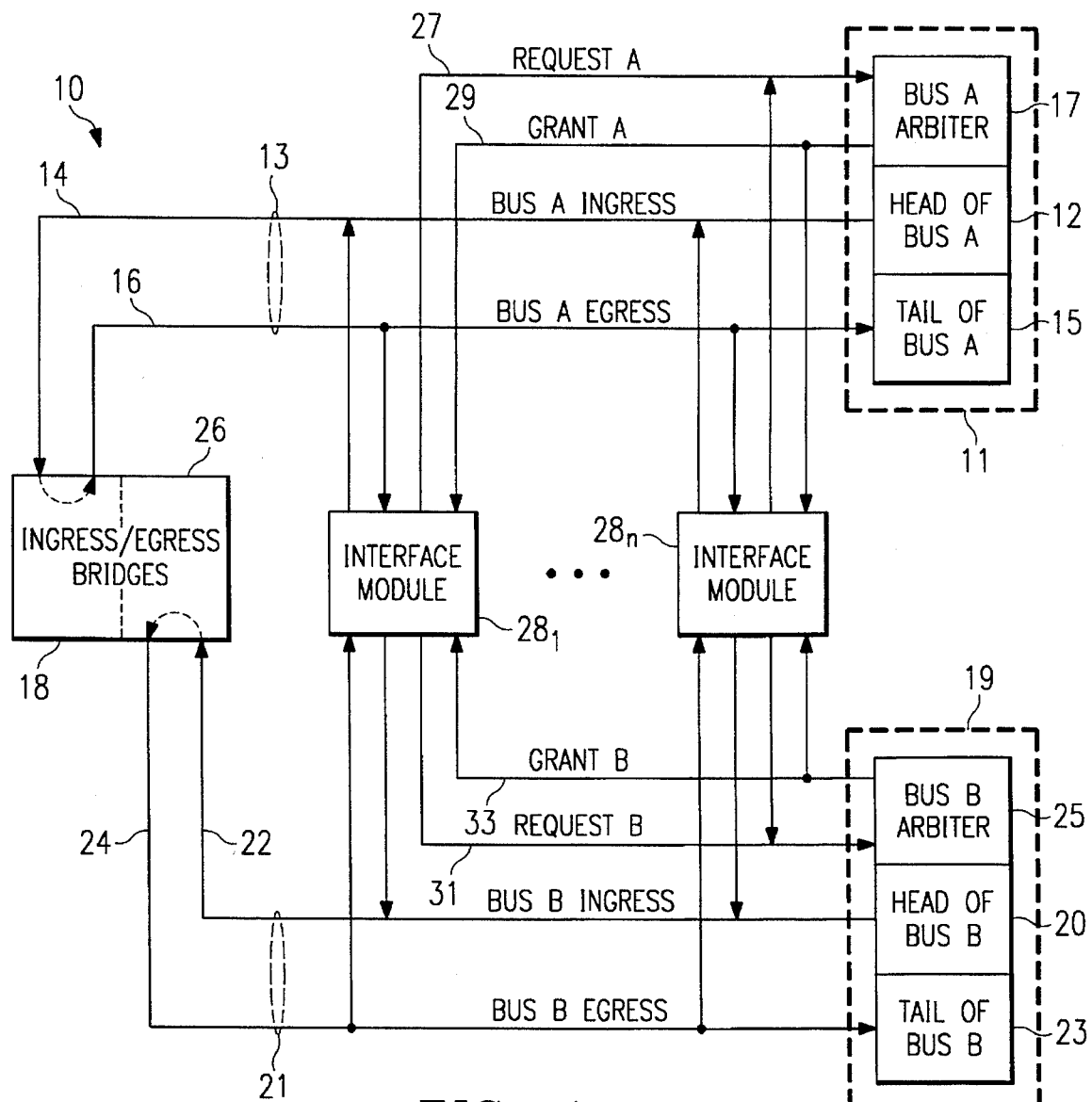
FIG. 1 illustrates a block diagram of a multi-service switch for a telecommunications network constructed according to the teachings of the present invention.

FIG. 1 illustrates a block diagram of a multi-service switch for a telecommunications network indicated generally at 10 constructed according to the teachings of the present invention. A bus controller 11 has a head-of-bus control 12, a tail-of-bus control 15, and an arbiter 17. A slotted bus 13 has an ingress portion 14 and an egress portion 16. Ingress portion 14 is coupled to an output of head-of-bus control 12, and egress portion 16 is coupled to an input of tail-of-bus control 15. An ingress/egress bridge 18 has an input and an output. The input of ingress/egress bridge 18 is coupled to ingress portion 14 of slotted bus 13, and the output of ingress/egress bridge 18 is coupled to egress portion 16 of slotted bus 13.

A second bus controller 19 has a second head-of-bus control 20, a second tail-of-bus control 23, and a second arbiter 25. A second slotted bus 21 has an ingress portion 22 and an egress portion 24. Ingress portion 22 is coupled to an output of head-of-bus control 20, and egress portion 24 is coupled to an input of tail-of-bus control 23. A second ingress/egress bridge 26 has an input and an output. The input of ingress/egress bridge 26 is coupled to ingress portion 22 of slotted bus 21, and the output of ingress/egress bridge 26 is coupled to egress portion 24 of slotted bus 21.

A number of interface modules $28_1$ through $28_n$ are connected to slotted bus 13 and slotted bus 21 as shown. Each interface module $28_1$ through $28_n$ has a first input coupled to egress portion 16 of first slotted bus 13, a first output coupled to ingress portion 14 of first slotted bus 13, a second input coupled to egress portion 24 of second slotted bus 21, and a second output coupled to ingress portion 22 of second slotted bus 21. Each interface module 28 includes a portion of a distributed switch that has multiple input and output queues interconnected by the dual buses through the inputs and outputs of each interface module.

In operation, multi-service switch 10 operates to support communication between interface modules $28_1$ through $28_n$ via slotted bus 13 and slotted bus 21. Head-of-bus control 12 and head-of-bus control 20 operate to generate the timing and controls necessary to configure time slots on slotted bus 13 and slotted bus 21 to allow communication over a number of bus overlays associated with different telecommunications data formats. Ingress/egress bridge 18 and ingress/egress bridge 26 operate to connect ingress portion 14 and egress portion 16 of slotted bus 13 and to connect ingress portion 22 and egress portion 24 of slotted bus 21. Bus 13 and bus 21 operate in a redundant manner to route data communication to and from interface modules $28_1$ through $28_n$. The use of redundant buses 13 and 21 provide for the continued operation of switch 10 in the event that either bus 13 or 21 fail for any reason.

Overview of the Slotted Buses

Multi-service switch 10 consists of a pair of slotted buses 13 and 21. In one embodiment of the present invention, each slotted bus operates at a nominal speed of 800 megabits per second (Mbps), for a combined speed of 1.6 gigabits per second (Gbps). In this embodiment, slotted bus 13 and slotted bus 21 are both identically formatted into two hundred time slots of sixty-four octets each and framed at a repetitive rate of 8 KHz.

Figure 2:
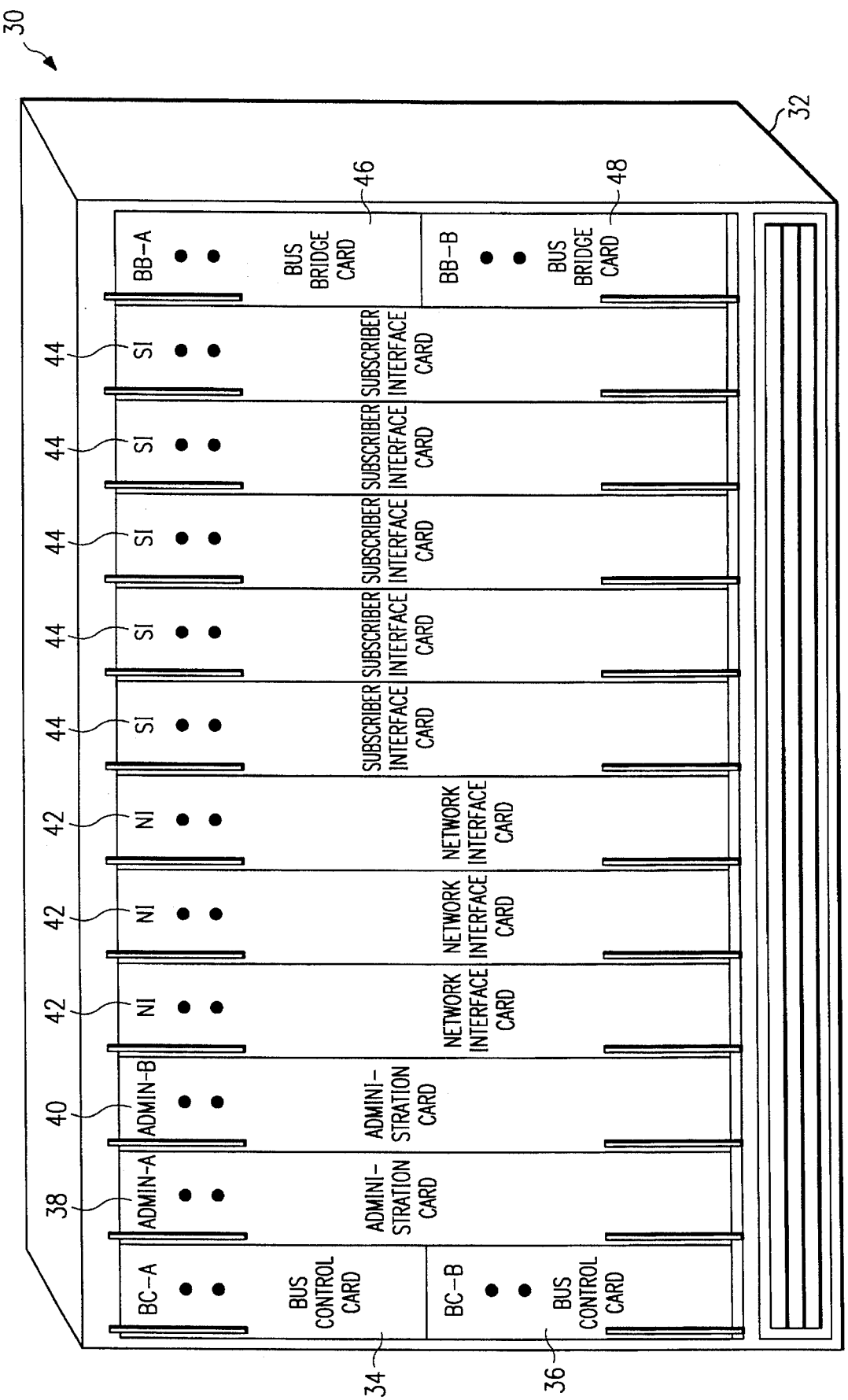
FIG. 2 illustrates an example of a single chassis for implementing a multi-service switch for a telecommunications network constructed according to the teachings of the present invention.

Slotted bus 13 and slotted bus 21 are formed from unidirectional ingress portions 14 and 22 and unidirectional egress portions 16 and 24 extending the entire length of the attached interface modules $28_1$ through $28_n$, with the ingress portions 14 and 22 and the egress portions 16 and 24 connected together by ingress/egress bridges 18 and 26. Physically, multi-service switch 10 is contained in a chassis or a cluster. A chassis is a number of interface modules coupled with head-of-bus controls and ingress/egress bridges. One embodiment of a chassis is illustrated in FIG. 2. A cluster is a collection of one to four chassis all sharing the same slotted buses. Head-of-bus control 12 and head-of-bus control 20 create the timing and control for ingress portions 14 and 22. Ingress/egress bridges 18 and 26 generate the timing and control for egress portions 16 and 24 connecting the ingress portions to the egress portions retiming each signal with derived egress portion timing. Every interface module $28_1$ through $28_n$ residing in a chassis or a cluster interfaces to both slotted bus 13 and slotted bus 21 using ingress portions 14 and 22 to source incoming traffic into the system of multi-service switch 10 and using egress portions 16 and 24 to sink outgoing traffic from the system of multi-service switch 10.

Slotted bus 13 and slotted bus 21 are hybrid in nature in that the bus time slots are individually allocated to support one of two major types of telecommunications service categories, isochronous services or asynchronous services. Isochronous services are telecommunications services that require predictable and periodic access to the slotted buses. All circuit services are included in this category and are supported via two isochronous overlays using a portion of reserved bandwidth of slotted buses 13 and 21. Asynchronous services are those that support bursty telecommunications information. All packet services including asynchronous transfer mode (ATM) services are supported by an asynchronous overlay using the remainder of the slotted bus bandwidth not reserved for isochronous services.

Allocation of Slotted Bus Bandwidth

The bandwidth of the slotted buses 13 and 21 is allocated to isochronous or asynchronous services with a granularity of one time slot by designating each time slot as reserved either for isochronous or asynchronous access. These two categories of telecommunications services are therefore entirely isolated from each other although they may share neighboring time slots on the same physical buses. Isochronous time slots are allocated for the exclusive use of circuit services. Since isochronous bandwidth is not shared with asynchronous bandwidth, no performance degradation is experienced by circuit services due to the presence of statistical traffic on slotted bus 13 and 21.

Time slots on slotted buses 13 and 21 are dynamically allocated to either isochronous services or asynchronous services. All time slots are initially allocated to asynchronous services until the need for an isochronous time slot arises. At this point, the necessary number of time slots are reserved for isochronous services. This reservation is communicated to interface modules $28_1$ through $28_n$ by head of bus control 12 and 20 via a single signal transported in parallel with other slot timing information down the slotted bus. The time slots reserved for isochronous access are no longer part of the asynchronous bandwidth. After reserving time slots for isochronous use, the isochronous services are assigned octets within the reserved time slots to effect the connections needed. Reallocation of the isochronous time slots back to asynchronous services requires the assignments of octets to be removed. Once these assignments are removed and the time slots are cleared of isochronous traffic, the time slots again can be allocated to asynchronous services.

Virtual buses of variable bandwidth capacity are overlaid on physical slotted buses 13 and 21 by this allocation of individual time slots to one or another access category. This allocation of time slots to create virtual buses is referred to as a bus overlay. In one embodiment of the present invention, three unique bus overlays are implemented: (1) a narrowband bus overlay (NBO) for narrowband isochronous services, (2) a wideband bus overlay (WBO) which includes from wideband to broadband isochronous services, and (3) a packet bus overlay (PBO) for asynchronous services. Each of these bus overlays supports a different classification of telecommunications traffic and is formed by concatenating a variable number of bus time slots. Each bus overlay implements a unique protocol for access to and from the overlay.

The narrowband bus overlay and the wideband bus overlay use time slots reserved for isochronous use. The narrowband bus overlay occupies a variable number of isochronous time slots excluding those reserved for the wideband bus overlay, and services narrowband telecommunications connections. Narrowband connections are those operating at DS0 and N×56/64 kpbs rates. The wideband bus overlay occupies a variable number of isochronous slots excluding those reserved for the narrowband bus overlay, and services SONET/SDH connection as well as DS1/DS3 level multiplexing and cross-connecting. The remaining time slots not reserved for isochronous use are available to the packet bus overlay for use by asynchronous traffic.

The packet bus overlay occupies the time slots not explicitly reserved for isochronous use. This bandwidth forms a common pool shared among all interface modules requesting access to asynchronous time slots of the packet bus overlay. A minimum amount of bus bandwidth must always be made available for asynchronous access because internal management and control communications utilize the packet bus overlay.

Redundant bandwidth is allocated on slotted bus 13 and slotted bus 21 by making equivalent allocations on both buses when time slots are provisioned for isochronous services. The isochronous time slots repeat with a periodicity of 125 microseconds. Time slot interchanges (TSI) of any size are implemented by the concatenation of selected isochronous time slots. Isochronous interface modules accessing the narrowband and wideband bus overlays have the ability to simultaneously access both slotted buses 13 and 21 transmitting the same information on both buses, and receiving the same information from both buses. In this way, full redundancy for isochronous circuit-based services is implemented.

Asynchronous time slots in both slotted buses 13 and 21 form a common pool of bandwidth for the packet bus overlay with a combined capacity of up to 1.6 Gbps. Asynchronous interface modules have access to both slotted bus 13 and slotted bus 21 for transmission and reception. During normal, non-failure conditions, individual packets or cells are placed onto one of the two slotted buses based upon a load-sharing algorithm that assigns each virtual asynchronous connection to one of the slotted buses. Interface modules $28_1$ to $28_n$ receive the packets from either bus simultaneously, merging the packet streams from both buses into a single stream. In case of failure of one of the buses, virtual connections assigned to the failed bus are automatically switched over to the surviving bus. In this case, interface modules receive packets from the surviving bus only. In this way, full redundancy for asynchronous services is implemented.

Slotted Bus Control

An interface module $28_1$ through $28_n$ delineates bus time slots, frames, and multiframes on slotted bus 13 and slotted bus 21 to access properly the slotted buses. Each interface module $28_1$ through $28_n$ is operable to determine, from head-of-bus control signals, the current time slot number and the time slot type. Head-of-bus control 12 and head-of-bus control 20 operate to create the timing and control signals necessary to facilitate these functions of the interface modules $28_1$ through $28_n$ on ingress portions 14 and 22 of slotted bus 13 and slotted bus 21. Ingress/egress bridge 18 and 26 create the timing and control signals for egress portions 16 and 24 of slotted bus 13 and slotted bus 21 with each signal derived from its associated counterpart on the ingress portions 14 and 22 of slotted bus 13 and slotted bus 21. This is accomplished by regenerating the equivalent ingress portion signals onto the egress portion of buses 13 and 21.

A system bus transfer clock signal is associated with both ingress portions 14 and 22 and egress portions 16 and 24 of slotted bus 13 and slotted bus 21 and is transported in parallel with the data on slotted buses 13 and 21 to all interface modules $28_1$ through $28_n$ within a chassis or cluster. The system bus transfer clock signal synchronizes the timing for access and exchange of both data and control signals of slotted buses 13 and 21. Interface modules $28_1$ through $28_n$ use an associated ingress system bus transfer clock to clock data onto ingress portions 14 and 22 of slotted buses 13 and 21 at designated intervals whether the access is an asynchronous or isochronous access. Likewise, interface modules $28_1$ through $28_n$ use an associated system bus transfer egress clock to sample data from slotted buses 13 and 21 at designated intervals whether the access is an asynchronous or isochronous access. In one embodiment of the present invention, the system bus transfer clock signal has a nominal frequency of 25.6 MHz, which equates to a 39.1 nanoseconds cycle time, and is derived from a centralized system synchronization reference signal. The timing for both slotted buses 13 and 21 are generated from the same synchronization reference signal. Thus, the timing of independent slotted buses 13 and 21 are synchronous one to another with the exception of some minimal intrinsic jitter imposed by clock generation circuitry. This synchronization between slotted buses 13 and 21 is necessary to allow non-destructive manual redundant slotted bus switchovers for isochronous traffic in the narrowband and wideband bus overlays.

A slot synchronization pulse is associated with both ingress portions 14 and 22 and egress portions 16 and 24 of slotted bus 13 and 21 and is transported in parallel with slotted buses 13 and 21 to all interface modules $28_1$ through $28_n$ within a chassis or cluster. The slot synchronization pulse is a synchronization signal generated by head-of-bus control 12 and 20, utilized to delineate time slots on the associated ingress portions 14 and 22 or egress portions 16 and 24. The pulse is repeated once every time slot, every sixteen bus clock cycles, and identifies the beginning and ending boundaries of time slots on slotted buses 13 and 21.

Interface modules that require isochronous access are assigned bandwidth in a time division multiplexed (TDM) fashion. Such interface modules are assigned access to specifically numbered time slots or a portion thereof in every frame. Therefore, these interface modules are explicitly aware of the relative number of the current time slot within the frame at all times. Rather than busing a tag or count in parallel with the data on the slotted buses 13 and 21 to identify the time slot number within the frame, each isochronous interface module derives the current time slot number using a frame synchronization pulse and the slot synchronization pulse.

An isochronous slot reservation signal is associated with both ingress portions 14 and 22 and egress portions 16 and 24 of slotted buses 13 and 21 and is transported in parallel with slotted buses 13 and 21 to all interface modules $28_1$ through $28_n$ within a chassis or cluster. The isochronous slot reservation signal generated by head-of-bus 12 and 20, specifically identifies time slots on associated ingress portions 14 and 22 or egress portions 16 and 24 reserved for isochronous use and thus not available for asynchronous access. The isochronous slot reservation signal gives notification to all interface modules $28_1$ through $28_n$ in a chassis or cluster, one time slot interval in advance, of whether a time slot is reserved for isochronous access. Thus, the isochronous slot reservation signal is active for an entire time slot interval if the subsequent bus time slot is reserved for isochronous access. This signal is not essential for asynchronous access on ingress portions 14 and 22 due to the fact that an explicit bus access grant is given to an interface module $28_1$ through $28_n$ for asynchronous access, and an implicit bus access grant is assigned based on the time slot position within the frame or multiframe for isochronous access. However, all interface modules $28_1$ through $28_n$ are operable to check the state of the isochronous slot reservation signal prior to transmitting onto the bus to add a measure of security to the operation of both the ingress and egress portions of buses 13 and 21.

A system bus frame synchronous pulse is associated with both ingress portions 14 and 22 and egress portions 16 and 24 of slotted buses 13 and 21 and is transported in parallel with data to all interface modules $28_1$ through $28_n$ within a chassis or cluster. This pulse is a synchronization signal generated by head-of-bus control 12 and 20, and delineates frames on slotted buses 13 and 21. The pulse is repeated every 125 microseconds and identifies the beginning and ending boundaries of a frame on one of the slotted buses 13 and 21.

A system bus multiframe synchronization pulse is associated with both ingress portions 14 and 22 and egress portions 16 and 24 of slotted buses 13 and 21 and is transported in parallel with data on slotted buses 13 and 21 to all interface modules $28_1$ through $28_n$ within a chassis or cluster. This pulse is generated by head-of-bus 12 and 20 and delineates multiframes which are contiguous blocks of 48 frames on slotted buses 13 and 21. This pulse is repeated every six milliseconds. The multiframe synchronization pulse identifies the beginning and ending boundaries of a multiframe on slotted buses 13 and 21. The multiframe structure is utilized by the narrowband bus overlay to efficiently encode signaling information onto the slotted buses 13 and 21.

Asynchronous Time Slot Arbitration

The bursty nature of asynchronous traffic necessitates regulation of on demand ingress access to asynchronous time slots on slotted buses 13 and 21. This strict regulation ensures that all packet interface modules obtain an equitable amount of the asynchronous ingress bus bandwidth of the packet bus overlay. This requires arbitration of multiple individual requests for each time slot that is available for asynchronous traffic. One embodiment of an asynchronous bus arbiter is disclosed in Applicant's copending U.S. patent application Ser. No. 08/228,513, entitled "A Bus Arbitration Method for Telecommunications Switching" the disclosure of which is incorporated herein by reference.

Arbitration in the multi-service switch 10 is executed by two centralized arbiters, a first bus A arbiter 17 arbitrating access to the asynchronous overlay on bus A, and a second bus B arbiter 25 regulating access to bus B. An output of interface modules $28_1$ to $28_n$ is connected to a multiplexed request A bus 27° Multiplexed request A bus 27 is connected to an input of bus A arbiter 17. An output of bus A arbiter 17 is connected to a grant A signal 29. The grant A signal 29 is in turn connected to an input of each interface module $28_1$ to $28_n$. A second output of interface modules $28_1$ to $28_n$ is connected to a multiplexed request B bus 31. The request B bus 31 is in turn connected to an input of bus B arbiter 25. An output of bus B arbiter 25 is connected to a grant B signal 33. The grant B signal 33 is connected to an input of each interface module $28_1$ to $28_n$. Interface modules $28_1$ to $28_n$ issue requests to transmit datagram packets into buses A or B according to the bus selection assigned to each datagram by the load sharing algorithm. Multiple simultaneous requests for transmission of different datagrams of different classes of services into bus A or B may be issued by each interface module $28_1$ to $28_n$. Bus arbiters 17 and 25, operating independently of each other, issue grants to specific interface modules to access individual asynchronous time slots, as disclosed in copending U.S. patent application Ser. No. 08/228,513, entitled "A Bus Arbitration Method for Telecommunications Switching".

Redundancy of the Slotted Buses

As discussed, multi-service switch 10 consists of physically identical but independent slotted buses 13 and 21. Each is coupled to independent head-of-bus/tail-of-bus controls 12, 15 and 20, 23 and provides independent bandwidth capacity of 800 Mbps. Both slotted buses 13 and 21 provide support for isochronous circuit-based and asynchronous packet-based telecommunications services. These services differ in the manner in which they utilize slotted buses 13 and 21, in the way that service is provided, and in the manner in which redundancy is handled.

For isochronous circuit-based services, slotted buses 13 and 21 are completely one-for-one redundant resources. One slotted bus is the active isochronous virtual bus and carries all circuit-based traffic within multi-service switch 10. The other is the redundant isochronous virtual bus and remains on standby prepared to assume active status in the event of a failure on the currently active bus. Completely redundant isochronous bandwidth is reserved and transmitted simultaneously on both slotted buses 13 and 21 so that either is able to support the total required isochronous bandwidth independent of the other slotted bus. Multi-service switch 10 can support fully redundant isochronous services requiring a total of nearly 800 Mbps. Slightly less than 800 Mbps of bandwidth is available for circuit traffic of entities on the network considering that some bandwidth must be reserved to support management and control communications within multi-service switch 10.

For asynchronous packet-based services within multi-service switch 10, slotted buses 13 and 21 are completely independent parallel asynchronous virtual bus resources available for providing service amongst all packet interface modules. Completely independent arbitration is performed on both buses simultaneously for traffic requesting access to either bus. Arbitration for one bus is implemented by a bus arbiter 17 and 25 associated with that bus, residing in the bus controller 11 and 19, respectively. Each interface module $28_1$ through $28_n$ that desires asynchronous time slots in one bus issues independent requests to the appropriate asynchronous bus arbiter. Under normal operation (i.e., non-failure situation), a software algorithm controlling packet services load-balances the use of slotted buses 13 and 21 by each interface module $28_1$ to $28_n$ on a virtual circuit-by-circuit basis by specifically assigning each virtual circuit to utilize either slotted bus 13 or slotted bus 21.

In the event of a failure of one of the asynchronous virtual buses or its associated controls, all interface modules requesting access to the failed bus interleave their bus requests from both buses to the one remaining functional bus. In this way, the multi-service switch 10 supports packet services requiring a total of nearly 1.6 Gbps of peak bandwidth in a normal non-redundant configuration. In a bus-failed condition, the peak asynchronous bandwidth of multi-service switch 10 is reduced to 800 Mbps. In this state, the asynchronous bus arbiter coupled with the interface modules work together to fairly distribute amongst all users any performance degradation resulting from congestion brought on by a bus failure.

Dynamic Time Slot Allocation

Head-of-bus control 12 and head-of-bus control 20 are operable to configure the plurality of time slots on slotted bus 13 and slotted bus 21, respectively, to maintain a plurality of bus overlays each associated with one of a plurality of unique data formats supporting a plurality of telecommunications services. Head-of-bus control 12 and head-of-bus control 20 are also operable to allocate dynamically the plurality of time slots between an isochronous overlay and an asynchronous overlay without disruption of data transmission.

Some server interface modules $28_1$ through $28_n$ are operable to receive data from the egress portions 16 and 24 of either slotted bus 13 or 21 in a first data format, provide the appropriate service interworking to transform the data from the first data format to a second data format, and transmit the data on ingress portions 14 and 22 of either slotted bus 13 or 21 in the second data format. Other network and subscriber interface modules $28_1$ through $28_n$ are also operable to receive telecommunications information from an external transmission medium, transform the telecommunications information into one of a plurality of data formats, and to transmit the telecommunications information on ingress portions 14 or 22 of either slotted bus 13 or 21 in one of a plurality of data formats. Likewise these same modules are operable to take telecommunication information from the egress portions 16 and 24 of either slotted bus 13 or 21 in one of a plurality of data formats and transmit this telecommunications information to an external transmission medium.

Physical Configuration of Multi-Service Switch

FIG. 2 illustrates an example of single chassis 30 for implementing a multi-service switch for a telecommunications network constructed according to the teachings of the present invention. A chassis frame 32 comprises twelve slots. The first chassis slot holds a bus control (BC-A) card 34 and a bus control (BC-B) card 36. Bus control card 34 comprises a head-of-bus control for a first slotted bus, and bus control card 36 comprises a head-of-bus control for a second slotted bus. Chassis slots two and three hold administration (ADMIN-A) card 38 and a redundant administration (ADMIN-B) card 40. Administration card 38 and a redundant administration card 40 comprise circuitry for controlling the administration of both slotted buses. In this example, chassis slots four, five and six are shown to hold network interface (NI) cards 42. Network interface cards 42 hold circuitry for a network interface module connecting a network entity to the first slotted bus and the second slotted bus for communications. Chassis slots seven, eight, nine, ten and eleven hold subscriber interface (SI) cards 44. Subscriber interface cards 44 hold circuitry for a subscriber interface module connecting the first slotted bus and the second slotted bus to subscriber entities. Chassis slot twelve holds a bus bridge (BB-A) card 46 and a bus bridge (BB-B) card 48 for bridging the first slotted bus and the second slotted bus, respectively.

In operation, the cards held by a single chassis cluster 30 operate as a multi-service switch for telecommunications network as described with reference to FIG. 1. The illustration of FIG. 2 is provided for better understanding of the physical appearance of one embodiment of such a switch.

Multi-Service Switch Having Extended Bus

Figure 3:
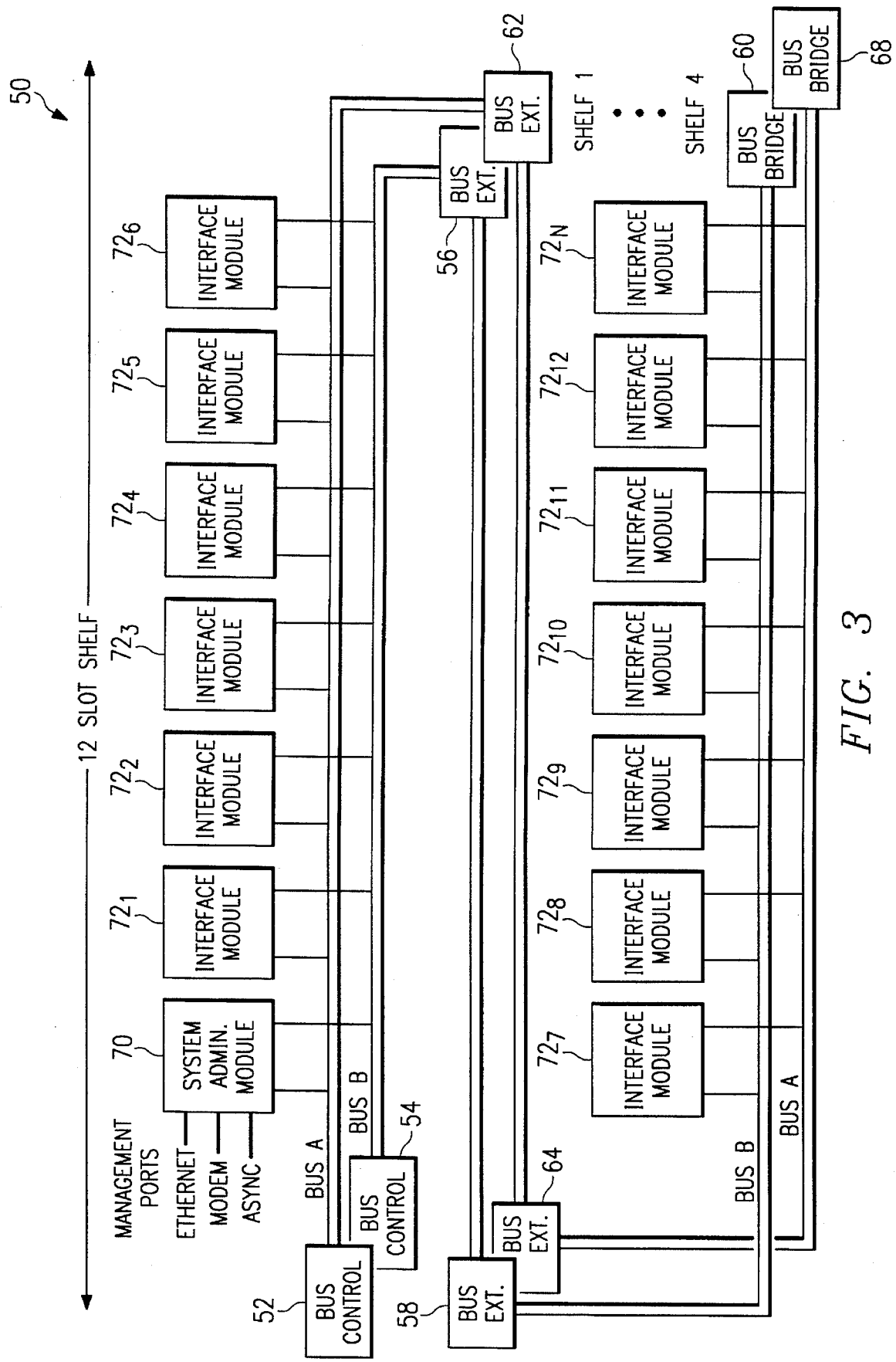
FIG. 3 illustrates a block diagram of a multi-service switch for a telecommunications network having an extended bus constructed according to the teachings of the present invention.

FIG. 3 illustrates a block diagram of a multi-service switch for a telecommunications network having an extended bus, indicated generally at 50, constructed according to the teachings of the present invention. Multi-service switch 50 forms a cluster comprising one to four chassis each having a 12 slot shelf as shown in FIG. 2. An expanded cluster consists of two or more chassis linked together through an extended bus to provide from twelve to forty-eight chassis slots for interface modules.

Multi-service switch 50 comprises a bus control 52 for Bus A and a bus control 54 for Bus B. Bus A is extended by bus extension 62 and bus extension 64 and is bridged by bus bridge 68 as shown. Bus B is extended by bus extension 56 and bus extension 58 and is bridged by bus bridge 60 as shown. A system administration module 70 is coupled to both Bus A and Bus B and is connected to three external system management ports: Ethernet, Modem, and Async.

Multi-service switch 50 also comprises a number of interface modules $72_1$ through $72_n$. These interface modules $72_1$ through $72_n$ interface between telecommunications entities and Bus A and Bus B. Interface modules $72_1$ through $72_n$ support either isochronous services, asynchronous services, or both. Each interface module $72_1$ through $72_n$ is connected to both Bus A and Bus B and operates identically as described with reference to interface modules $28_1$ through $28_n$ of FIG. 1.

In operation, multi-service switch 50 operates to control communications between a number of telecommunications entities. The operation of multi-service switch 50 is the same as multi-service switch 10 described with respect to FIG. 1, except for the bus extensions 56, 58, 62 and 64. Bus extensions 56, 58, 62 and 64 operate to extend control, timing and data on Bus A and Bus B on one chassis to subsequent portions of Bus A and Bus B on the adjacent chassis. Bus control 52 and 54 control the initial timing for data. When ingress data reaches bus extension 56 and bus extension 62, bus extensions 56 and 62 in the first chassis pass the data on to bus extension 58 and bus extension 64 in the second chassis. Bus extensions 58 and 64 in turn pass ingress data on to extended buses A and B and to bus bridges 60 and 68. Bus bridges 60 and 68 then return the egress data back to bus extensions 58 and 64 by means of the bus egress portions. Bus extensions 58 and 64 pass the egress data from the second chassis on to bus extensions 56 and 62, and bus extensions 56 and 62 pass the egress data back to bus control 52 and bus control 54 via the bus egress portions of the first chassis. Multi-service switch 50 operates otherwise as described with reference to multi-service switch 10. In this manner, the multi-service switch architecture of the present invention can be extended to service a large number of interface modules by using bus extenders to modularly interconnect additional redundant bus segments.

Telecommunications Environment Utilizing
Multi-Service Switches

Figure 4:
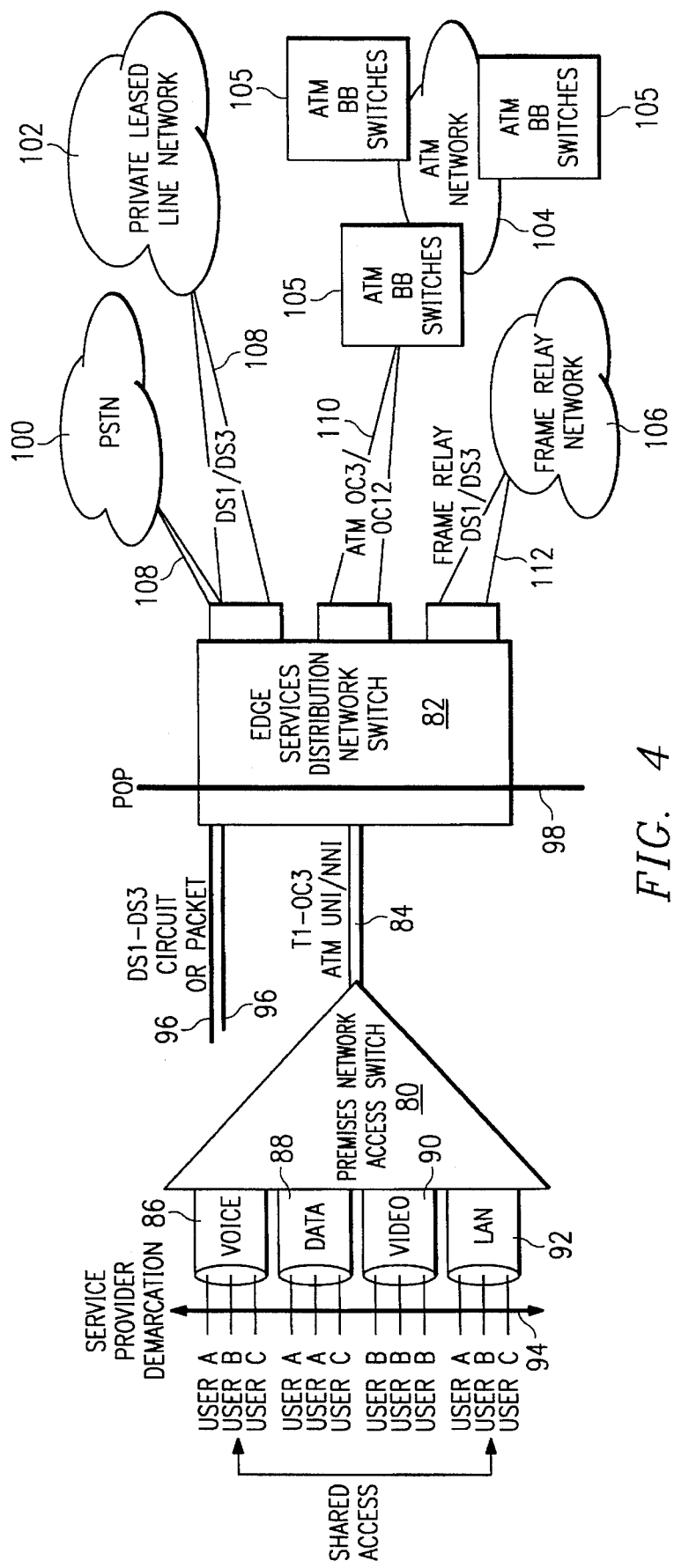
FIG. 4 illustrates a block diagram of a telecommunications environment utilizing multi-service switches for a telecommunications network constructed according to the teachings of the present invention.

FIG. 4 illustrates a block diagram of one typical telecommunications environment utilizing multi-service switches for telecommunications networks constructed according to the teachings of the present invention. A premises network access switch 80 is coupled to an edge services distribution network switch 82 by a copper or optical bus 84. Premises network access switch 80 receives and transmits voice telecommunications information 86, data telecommunications information 88, video telecommunications information 90 and local area network (LAN) telecommunications information 92. The line between service provider and user entity is indicated by Service Provider Demarcation line 94. As shown in FIG. 4, Users A through C have shared access to the telecommunications information switched by premises network access switch 80.

Edge services distribution network switch 82 receives DS1–DS3 circuit or packet information via lines 96 and transfers it to the telecommunications network at the point of presence (POP) indicated by line 98. Edge services distribution network switch 82 communicates with public switched telephone networks (PSTN) 100, private leased line networks 102, asynchronous transfer mode (ATM) networks 104, and frame relay networks 106. Asynchronous transfer mode backbone networks 104 will eventually be constructed with large ATM broadband switches 105 located in the center of the network. Edge services distribution network switches 82 will also communicate with the existing public circuit switched telephone network 100 and private leased line network 102 via DS1/DS3 lines 108. Edge services distribution network switch 82 communicates with asynchronous transfer mode backbone networks 104 via ATM OC3/OC12 lines 110 and communicate with existing frame relay backbone networks 106 via frame relay DS1/DS3 lines 112.

In operation, the telecommunications environment shown in FIG. 4 operates to allow multiple independent user entities A through C at a premises to transmit and receive telecommunications services and to communicate with other user entities at the premises and to communicate with outside entities through switching provided by a common shared premises network access switch 80, access link 84, and edge services distribution network switch 82. User entities A, B and C communicate with one another on premises using voice, data, video and local area network telecommunications information services. Premises network access switch 80 operates to allow users to communicate with one another. Premises network access switch 80 also communicates via optical line 84 with an edge services distribution network switch 82. Edge services distribution network switch 82 operates to allow communication with outside entities. Possible outside destinations and sources are those shown in FIG. 4.

Premises network access switch 80 and edge services distribution network switch 82 may utilize multi-service switches for telecommunications networks constructed according to the teachings of the present invention to implement switching of telecommunications services.

Bus Overlays

Figure 5A:
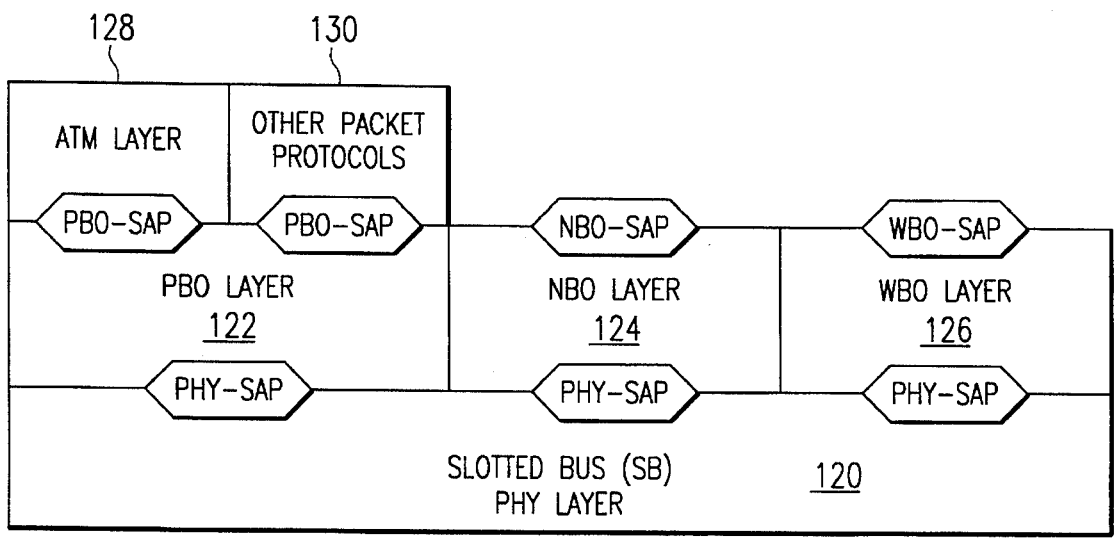
FIG. 5a illustrates three bus overlays on a physical slotted bus according to the teachings of the present invention.

FIG. 5a illustrates a protocol stack of three bus overlays on a physical slotted bus operating in accordance with the teachings of the present invention. A slotted bus (SB) physical (PHY) layer 120 models the physical slotted buses of the multi-service switch of the present invention. The SB PHY layer implements the actual transfer of data, both asynchronous and isochronous, to and from the time slots of the slotted buses. A packet bus overlay (PBO) layer 122, a narrowband bus overlay (NBO) layer 124, and a wideband bus overlay (WBO) layer 126 model three unique access protocols for using the physical transport services provided by the slotted bus physical layer 120 of the multi-service switch of the present invention for three different classification of services. The asynchronous transfer mode (ATM) layer 128 and other packet protocols 130 model protocol layers using the PBO layer through appropriate service access points (SAP) for providing asynchronous transfer mode communications and other packet-based data communications.

Packet bus overlay layer 122 models the packet bus overlay access protocol of the multi-service switch of the present invention and implements the set of services used by the asynchronous transfer mode layer 128 or by other packet protocols 130 supported by the multi-service switch of the present invention. The PBO layer 122 allows the exchange of fixed-length packets across the slotted buses of the multi-service switch as a connectionless datagram service. Packet bus overlay layer 122 is optimized to provide efficient transport services for 53 octet cell payloads (e.g., ATM cells) amongst multiple interface modules residing throughout a multi-service switch chassis or cluster of chassis. The packet bus overlay 122 is used to implement all asynchronous packet-based services including cell-based and frame-based services supported by the multi-service switch of the present invention. In addition to the packet bus overlay layer 122, the slotted bus physical layer 120 supports a narrowband bus overlay 124 and a wideband bus overlay 126.

According to the teachings of the present invention, the slotted bus physical layer 120 is configurable to maintain a plurality of bus overlays. Each bus overlay is associated with one of a plurality of unique data formats supporting a plurality of telecommunications services. As shown in FIG. 5a, slotted bus physical layer 120 supports packet bus overlay layer 122 for asynchronous communication services, narrowband bus overlay layer 124 for narrowband isochronous communication services, and wideband bus overlay layer 126 for wideband isochronous communication services. This operation creates three virtual buses operating independently on one physical bus.

Allocation of Time Slots Between Three Bus Overlays

Figure 5B:
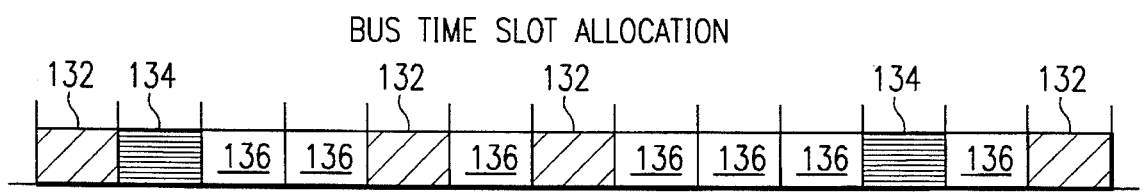
FIG. 5b illustrates allocation of bus time slots between three bus overlays according to the teachings of the present invention.

FIG. 5b illustrates allocation of bus time slots between three bus overlays according to the teachings of the present invention. FIG. 5b illustrates a number of bus time slots where the time slot on the left comes sooner in time than the time slots on the right. As time advances, the bus time slots move along the bus from right to left carrying data relating to telecommunications information. Time slots 132 are allocated to an isochronous wideband bus overlay and as such, occur with periodicity of 125 microseconds. However, the slots composing the wideband, narrowband overlay are selected from any slots currently available for asynchronous traffic, even if they are not evenly spaced in the 125 microsecond frame. Each slot of the plurality of slots comprising an isochronous (narrowband, wideband) overlay repeat with periodicity of 125 microseconds, but the time relationship between slots of the same overlay is unconstrained. Similarly, time slots 134 are allocated to a narrowband bus overlay, and as such, their periodicity is 125 microseconds, although the time lapse between arrivals of a time slot 134 may not be constant. Time slots 136 are allocated to an asynchronous packet bus overlay and occupy the remainder of the bus traffic. Thus, all three overlays exist simultaneously and independently of one another by allocation to separate time slots. A multi-service switch for a telecommunications network constructed according to the teachings of the present invention is operable to allocate dynamically the plurality of time slots on the slotted bus between bus overlays without a disruption of data transmission. For example, time slots allocated to isochronous data and asynchronous data according to a particular mapping can be re-allocated to a different mapping without disrupting transmission of the remaining traffic.

Packet Bus Overlay

Figure 6A:
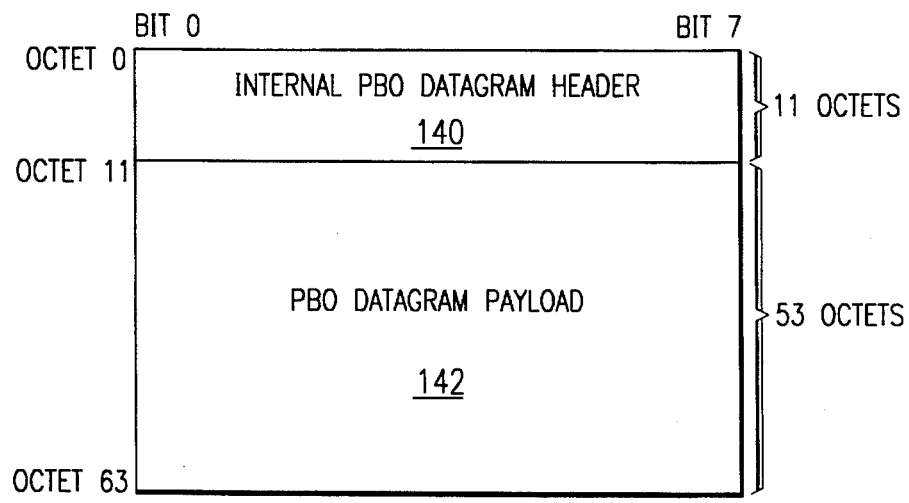
FIG. 6a illustrates an asynchronous packet bus overlay datagram format according to the teachings of the present invention.

FIG. 6a illustrates an asynchronous packet bus overlay datagram format constructed according to the teachings of the present invention. The datagram format includes an internal packet bus overlay (PBO) datagram header 140 and a packet bus overlay (PBO) datagram payload 142. The datagram format includes sixty-four octets where each octet is eight bits of data as shown. Internal packet bus overlay datagram header 140 consumes the first eleven octets, octet 0 through octet 10. Packet bus overlay datagram payload 142 consumes the last fifty-three octets, octet 11 through octet 63.

The packet bus overlay operates to provide a connectionless datagram transfer service between packet bus overlay addressable entities through a multi-service switch constructed according to the teachings of the present inventions. A packet bus overlay datagram describes a sixty-four octet packet composed of eleven octets of reserved overhead, along with a fifty-three octet datagram payload optimized to carry an asynchronous transfer mode cell, as illustrated in FIG. 6a. Addressing and routing control information is included in datagram header 140 to allow the packet bus overlay datagram service to be extended throughout a single cluster or multi-cluster switching system. A multi-cluster switching system consists of multiple multi-service switch clusters interconnected via the expansion mechanism of FIG. 3. Further, a multi-cluster switching system consists of multiple clusters interconnected via a self-routing switching fabric. Such an asynchronous transfer mode switching fabric is disclosed in U.S. patent application Ser. No. 08/228,598, entitled "Buffered Crosspoint Matrix for an Asynchronous Transfer Mode Switch and Method of Operation" assigned to the assignee of the present application, the disclosure of which is incorporated herein by reference.

Figure 6B:
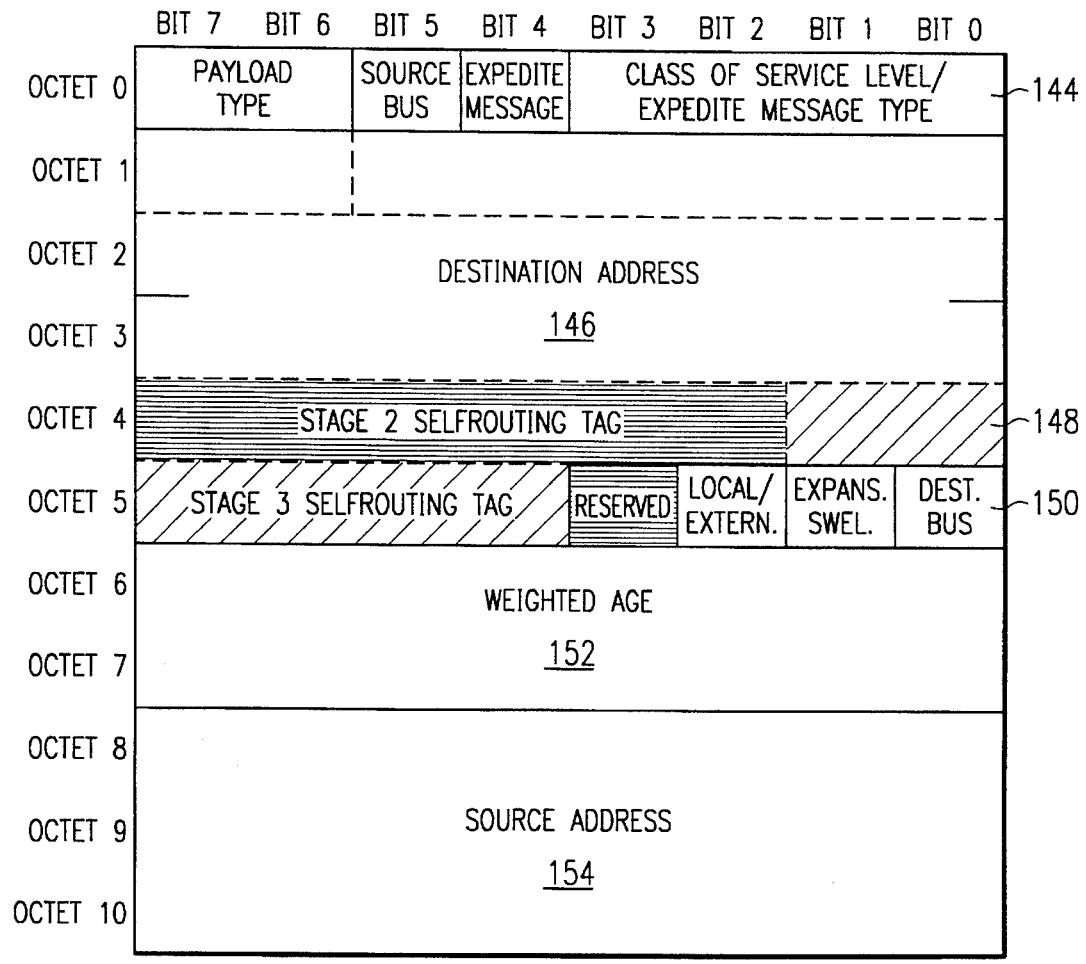
FIG. 6b illustrates an asynchronous datagram header format according to the teachings of the present invention.

FIG. 6b illustrates a packet bus overlay datagram header format. The packet bus overlay datagram header format includes 11 octets, octet 0 through octet 10, each comprising 8 bits as shown. A first octet 144 includes the payload type, source bus, expedite message indicator and class of service level/expedite message type information. The next three octets hold the destination address 146 for the datagram. A fifth octet 148 holds a stage 2 self-routing tag and the first two bits of a stage 3 self-routing tag. A sixth octet 150 holds the last 4 bits of the stage 3 self-routing tag, and indications as to whether routing is to a local or external destination, and a selection of which expansion switching element and destination bus to utilize. The seventh and eighth octets hold a weighted age 152 (i.e., the cumulative age of the datagram within the system, weighted by a factor), and the ninth through eleventh octets hold the source address 154 of the associated datagram.

The packet bus overlay datagram header contains all of the internal overhead information required to support full connectionless bearer service of datagrams throughout a multi-service switch system. The header includes routing information for both point to point and point to multi-point delivery service, quality of service descriptors, cumulative weighted age, and payload type descriptors. FIG. 6b illustrates these various fields and their location in the packet bus overlay datagram header.

The packet bus overlay provides the fundamental packet-based transport services which asynchronous interface modules of the multi-service switch of the present invention utilize to provide standards based services and other asynchronous services. The packet bus overlay service encompasses many of the sophisticated features required by standard based packet services including support for multiple classifications of various quality of service (QoS), and elaborate traffic management, resource management and control mechanisms.

The packet bus overlay of the present invention supports frame-based services as well as cell-based services. Frame-based services are those services that use packets of variable length as the basic unit of data exchange. Examples of frame-based services are frame relay networks, and local area network (LAN) native protocols. Cell-based services, such as asynchronous transfer mode services, are those that use a small packet of fixed-size referred to as a cell. The packet bus overlay supports additional internal management threads that may use high priority in-band channels grafted in the asynchronous portion of the slotted buses. Both cell-based and frame-based services make use of the common PBO datagram format.

Figure 6C:
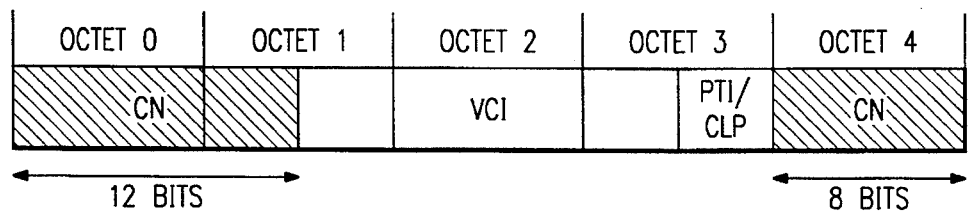
FIG. 6c illustrates a header field within an asynchronous transfer mode cell carried by the asynchronous packet bus overlay datagram according to the teachings of the present invention.

According to the teachings of the present invention, asynchronous packet bus overlay datagrams are formatted as eleven octets of internal overhead and fifty-three octets of payload as illustrated in FIG. 6a. The internal datagram overhead contains information required to support full connectionless bearer service for datagrams throughout the system. The payload of a packet bus overlay datagram carrying an asynchronous transfer mode cell is organized in similar fashion as a fifty-three octet asynchronous transfer mode cell. The first five octets of the 53 octet cell contain both asynchronous transfer mode layer protocol control information as well as connection identifiers. FIG. 6c illustrates the format of the five octet header for the asynchronous transfer mode cell internal to the multi-service switch 10. The five octet header contains an internal connection number and undisturbed VCI and PTI/CLP fields. The remaining forty-eight octets carry the asynchronous transfer mode cell payload. Because of the mapping of the datagram format of the present invention, minimal processing of asynchronous transfer mode cell traffic is required. Asynchronous transfer mode cell-based traffic is supported transparently without a need for further adaption to the asynchronous time slots. There exist cell-based modes other than ATM, such as IEEE 802.6 based SMDS services, that the PBO layer can transparently transport as well.

All frame-based traffic is mapped-to asynchronous transfer mode cells using a common adaption layer, namely AAL5, as a generic frame adaption mechanism. Frames are delimited, padded as required, segmented and inserted into the forty-eight octet payload of one or more asynchronous transfer mode cells at the ingress portion of the slotted bus. The associated asynchronous transfer mode cell header of FIG. 6c is appended to each asynchronous transfer mode payload to compose a complete asynchronous transfer mode cell that is in turn mapped as payload into a packet bus overlay datagram according to the teachings of the present invention. In the case of generic HDLC-based frame to asynchronous transfer mode service adaption, minimal processing of a datagram is needed at either ingress or egress portions of the slotted bus. In the case of frame-to-frame services, an equivalent reverse process at the egress portion of the slotted bus retrieves the datagram from the bus, and reassembles the frame for delivery to its destination.

The packet bus overlay allows implementation of statistical multiplexing and switching of a variety of packet services in concurrent fashion. Any fraction of the asynchronous bandwidth capacity of the slotted buses can be assigned to each service such as frame relay, cell relay, or SMDS. Encapsulation of upper level protocols into any of wide area network transfer protocols is also supported. Protocol conversions between transfer protocols, such as frame relay to cell relay, and 802.3 to cell relay, are supported by the datagram bearer services of the packet bus overlay according to the teachings of the present invention.

Packet Bus Overlay Addressing

Packet bus overlay addresses are used by the multi-service switch packet bus overlay to identify the originating and terminating end point entities of a packet bus overlay layer communication. These packet bus overlay entity addresses are assigned to each packet bus overlay layer entity of the multi-service switch system of the present invention as the need arises.

Packet bus overlay addresses that identify the destination end point or end points where a datagram is to be delivered are carried in the destination address field of the packet bus overlay datagram header. Addresses that identify the source end point originating the datagram are carried in the source address field of the datagram header. A packet bus overlay layer entity address is one of two types: individual or group.

Figure 6D:
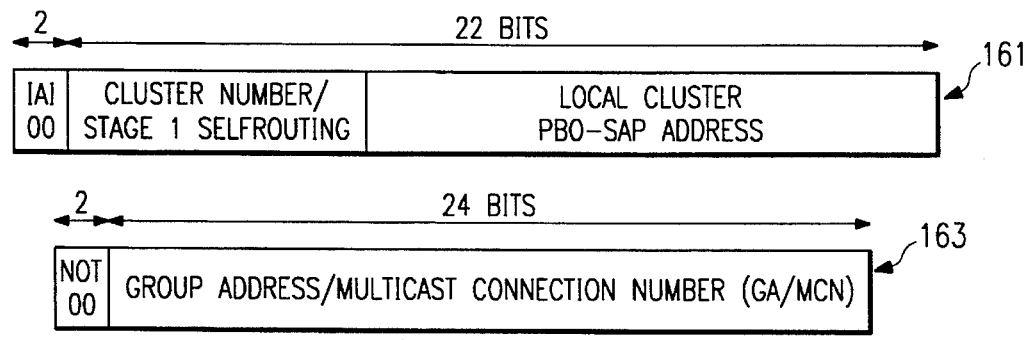
FIG. 6d illustrates formats for a destination address field within the packet bus overlay datagram according to the present invention.

FIG. 6d illustrates the format of the destination address field for both an individual and group address type. Individual addresses 161 are composed of three fields as illustrated in FIG. 6d. The first is a two bit field, called the Individual Address Indicator, which is set to the value øø to indicate that the format is an individual address format. The remaining 22 bits are divided into two fields: a cluster number/stage 1 self-routing tag, and a local cluster PBO-SAP address. The cluster number/stage 1 self-routing tag field serves a dual purpose. In a multi-service switch composed of multiple clusters of chassis 50, the cluster number field identifies one from a plurality of clusters as the destination of the datagram. If the multiple clusters are interconnected by a self-routing matrix, then the cluster number/ stage 1 self-routing field contains the self-routing tag for the first stage of the self-routing matrix, which coincides with the number of the cluster of chassis 50 connected to the output port of the self-routing matrix. The Local Cluster PBO-SAP address field contains the address of the destination interface module $72_1$ to $72_n$ (and port inside the module if more than one port per module) in the destination cluster of chassis 50.

The Group Address format 163 in FIG. 6d is made of two fields. The first is a two bit Individual Address Indicator field set to not-zero (i.e., 01, 10, or 11) to indicate that the rest of the destination address contains a group address/multicast connection number. The second field is the group address/ multicast connection number itself, which is an unstructured 22 bit address. When combined with the first two bit codepoints 01, 10 and 11, the group address/multicast connection number field can contain in excess of 12 million different addresses.

An individual address is assigned to a single entity of the system when a packet bus overlay entity is configured or attached to the system. An individual address thus uniquely identifies a single end point in the system as a potential source or destination of a packet bus overlay datagram. Therefore, individual addresses may be used as both source and destination addresses in packet bus overlay point to point datagrams.

A group address, on the other hand, may be assigned to one or more entities in the system. A group address identifies one or more packet bus overlay entities as potential recipients of the same datagram which is then referred to as a multi-cast datagram from one same source entity. Group addresses are only utilized as destination addresses. Unlike an individual address, a group address may be assigned to a group of entities for the duration of one connection only. A unique group address may be assigned to support a single multi-cast connection provided by a packet bus overlay upper layer entity 128 or 130 in FIG. 5a. When a group address is assigned to a group of entities for the duration of one connection, the group address is referred to as a multicast connection number (MCN). Using multi-cast connection numbers in place of generic group addresses can yield significant simplification in the administration of the group address number space and yield even further savings in the implementation requirements of the packet bus overlay upper layer entity, such as the asynchronous transfer mode layer user 128 in FIG. 5a, in providing multi-cast connection oriented services.

Quality of Service Classes

The packet bus overlay supports a number of different quality of service (QoS) classes, also referred to as classes of service (CoS). In one embodiment of a multi-service switch system constructed according to the teachings of the present invention, two attributes define a particular class of service. These attributes are the switching delay priority and the packet loss probability. Different combinations of values of those two attributes create multiple CoS levels. The overhead assigned to each datagram of the present invention can support multiple class of service levels. Four levels are discussed herein for illustrative purposes only. The packet bus overlay layer ensures a distinct service separation between the supported classes of service. This means that the packet bus overlay layer ensures that the two measurable goals of switching delay and packet loss probability are maintained for each of the four classes of service of this embodiment. This separation of classes is independent of the mix of traffic of different classes of service passing through the packet bus overlay. To accomplish service separation, the packet bus overlay layer discriminates amongst datagrams based on each datagram's associated class of service and acts accordingly. This discrimination requires some arbitration of the asynchronous requests for time slots on the slotted bus. One arbitration scheme which utilizes switching delay priority as an attribute to discriminate amongst multiple requests is described in U.S. patent application Ser. No. 08/228,513 entitled "A Bus Arbitration Method for Telecommunications Switching" which has been previously incorporated herein by reference.

The packet bus overlay of the present invention supports an additional class of service referred to as an expedite class of service which is not subjected to the same normal arbitration as the other classes of service and which is not measured in terms of its switching delay or packet loss characteristics. The expedite class of service is used for intersystem management communications of an urgent nature, such as a failure or congestion notifications. Expedite class of service datagrams are handled in a strict first come first serve order amongst themselves in this embodiment of the present invention. Expedite class of service datagrams do not compete directly with datagrams of the other four normal classes of service for access to the buses.

Bearer Services

The packet bus overlay layer provides entities with packet bus overlay bearer services consisting of both point to point (unicast) and point to multi-point (multicast) modes of data transfer. A unicast datagram is a datagram that contains a datagram header containing an individual destination address 161 in FIG. 6d associated with a single peer packet bus overlay entity. Conversely, a multi-cast datagram is a datagram that contains a header containing a group destination address 163 of FIG. 6d associated with one or more peer packet bus overlay entities. Multi-cast packet bus overlay datagram service is identical to unicast datagram service with the exception that each multi-cast datagram, obtained from a single source, is potentially copied from a slot of the asynchronous bus by multiple destination peer packet bus overlay entities, all of which are associated with the common group address.

Figure 6E:
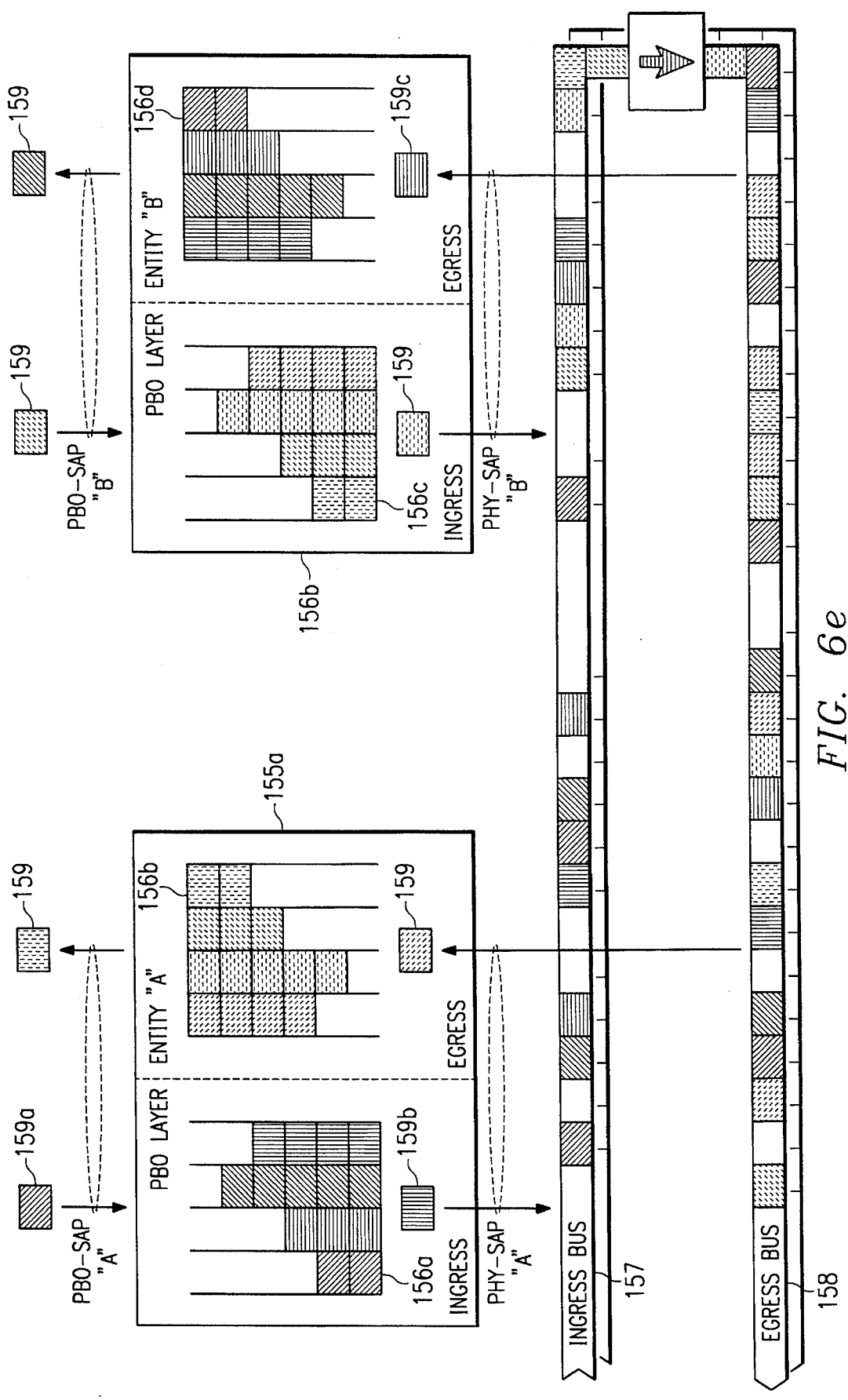
FIG. 6e illustrates a block diagram of packet bus overlay entity to packet bus overlay entity unicast datagram communication.

FIG. 6e illustrates a block diagram of entity to entity unicast communication. A first packet bus overlay layer entity 155a and a second packet bus overlay layer entity 155b communicate via an ingress bus 157 and an egress bus 158. Packet bus overlay layer entity 155a and packet bus overlay layer 155b communicate via datagrams 159.

The packet bus overlay unicast communication occurs between two peer packet bus overlay layer entities 155a and 155b within a multi-service switch system of the present invention. Unicast datagrams 159 are utilized for point to point transport of data having a number of different class of service levels between the two communicating peer entities 155a and 155b. As shown in the embodiment of FIG. 6e, there are four different class of service levels as indicated by the four queues in each of the ingress and egress queuing systems 156a–d in packet bus overlay layer entity 155a and packet bus overlay layer entity 155b. Datagrams 159a that originate after a request from a user of the packet bus overlay layer entity 155a are placed in the ingress queuing system 156a of packet bus overlay layer entity 155a while awaiting access to the underlying physical bus layer. Unicast datagrams 159b wait for granted access to an asynchronous time slot on ingress bus 157 for transmission throughout the multi-service switch system. The class of service level associated with datagrams 159b determines the priority that the packet bus overlay layer entity 155a requests from the arbiter and is granted for access to ingress bus 157.

The destination address of every datagram broadcasted via the asynchronous time slots on the egress bus 158 is examined one by one by peer packet bus overlay layer entities 155a and 155b. When destination peer packet bus overlay layer entity 155b recognizes a destination address matching one of its assigned individual addresses, packet bus overlay layer entity 155b creates a copy of the datagram 159c and places it in the egress queuing system 156d of packet bus overlay layer entity 155b according to the associated class of service level. The datagram 159c then awaits delivery to the upper layer entity. Unicast datagrams 159 are maintained in separate subqueues in all encountered queuing systems 156a–d according to their class of service in order to provide the separation of quality of service levels associated with each class of service. Asynchronous time slots are used both for local switching of packet services utilizing packet bus overlay datagrams between entities of the same slotted bus, entities in the same chassis or cluster, and for external switching between entities in different clusters.

Datagram Time Stamping and Aging

A multi-service switch constructed according to the teachings of the present invention supports multiple communications services with different quality of service requirements for switching delay and packet loss. Switching delay is more critical to some packet services than to others. Fast switching times are more important for example to video connections than to bulk data connections; thus video connections should be switched more expeditiously than bulk data connections. Data of time constrained communications services should be preferred over less time constrained communications services even when the latter have spent less time in the system. A priority scheme capable of discriminating between the time-related needs of the various communications services greatly reduces the switching delays and delay variations of time-sensitive communications services such as video and voice communications.

In a multi-service switch system of the present invention, the switching delay component of the quality of service is maintained by the packet bus overlay layer using a datagram timestamping procedure. The timestamping procedure utilizes the weighted age field of the datagram header illustrated in FIG. 6b. The timestamping process records the time of arrival of each datagram into a packet bus overlay layer queuing system. The datagrams are timestamped when they come into the system. In one embodiment of the present invention, the time stamp is a two's complement number stored locally associated with the datagram, calculated as the difference between the value of a time of arrival counter and the value in the weighted age field of the datagram header. At the time of departure of the datagram from the queue, the difference between the stored timestamp and the datagram's time of departure is calculated. The difference between these two values is the actual time spent by the datagram in the queue plus the age of the datagram when it arrived to the queue, in other words, the updated datagram's age.

In order to discriminate between multiple classes of service with different switching delay quality of service requirements, the aging process is weighted. The ages of datagrams of different classes increase at different rates, representing the varying urgency of their switching. A configurable parameter is associated with every class of service level and is used as a weighting factor to weight the age values calculated for datagrams of each class of service level. This feature is described in more detail in U.S. patent application Ser. No. 08/228,598 entitled "Buffered Crosspoint Matrix for an Asynchronous Transfer Mode Switch and Method of Operation" which has been previously incorporated herein by reference. Generally, the age of a datagram is multiplied by the weighting factor to produce the weighted age of the datagram. This weighted age value is then used to allow priorities and cumulative delay to be considered in the service discipline as a single figure of merit. When multiple datagrams of different switching delay priority compete for the same output, the one with the largest age value is selected next.

The operation of the weighted age algorithm is as follows: each class of service is equipped with a time counter that increments by one weight factor (WF) each switching interval. The WF value of each class is different and programmable. High priority delay classes of service are programmed with a higher WF value than low priority classes. The time counters of each class do not have to be synchronized. Assume that at the time of arrival of a datagram to a queue, the time counter associated with the datagram CoS contains the value $T_\phi$, and that the datagram's weighted age is $Age_\phi$. The timestamp is calculated as $TS=T_\phi-Age_\phi$. The value of TS is stored with the datagram. Assume that at the time of departure of the datagram, the time counter value is $T_1$, where $T_1>T_\phi$. The new age of the datagram is calculated as $T_1-TS=T_1-(T_\phi-Age_\phi)=(T_1-T_\phi)+Age_\phi$. Since $T_1-T_\phi$ is the weighted time spent by the datagram in this queue, the value obtained by this calculation is the new weighted age of the datagram, made of the previous weighted age, plus the weighted time spent in this queue.

Thus, the cumulative weighted age of a datagram equals the cumulative time spent in all the queues up to the present time multiplied by the associated weighting factor. This value is placed in the header of the datagram and carried between queues of the multi-service switch system of the present invention. The weighted age is represented as an integer number of bus time slot intervals. It is a system-wide variable, thus its value increases cumulatively when a datagram passes from one queue to the next queue in the switching system. The weighted age of a datagram is therefore updated and carried between queuing systems in the weighted age field of the datagram header.

Congestion of Output Buffer

Figure 7:
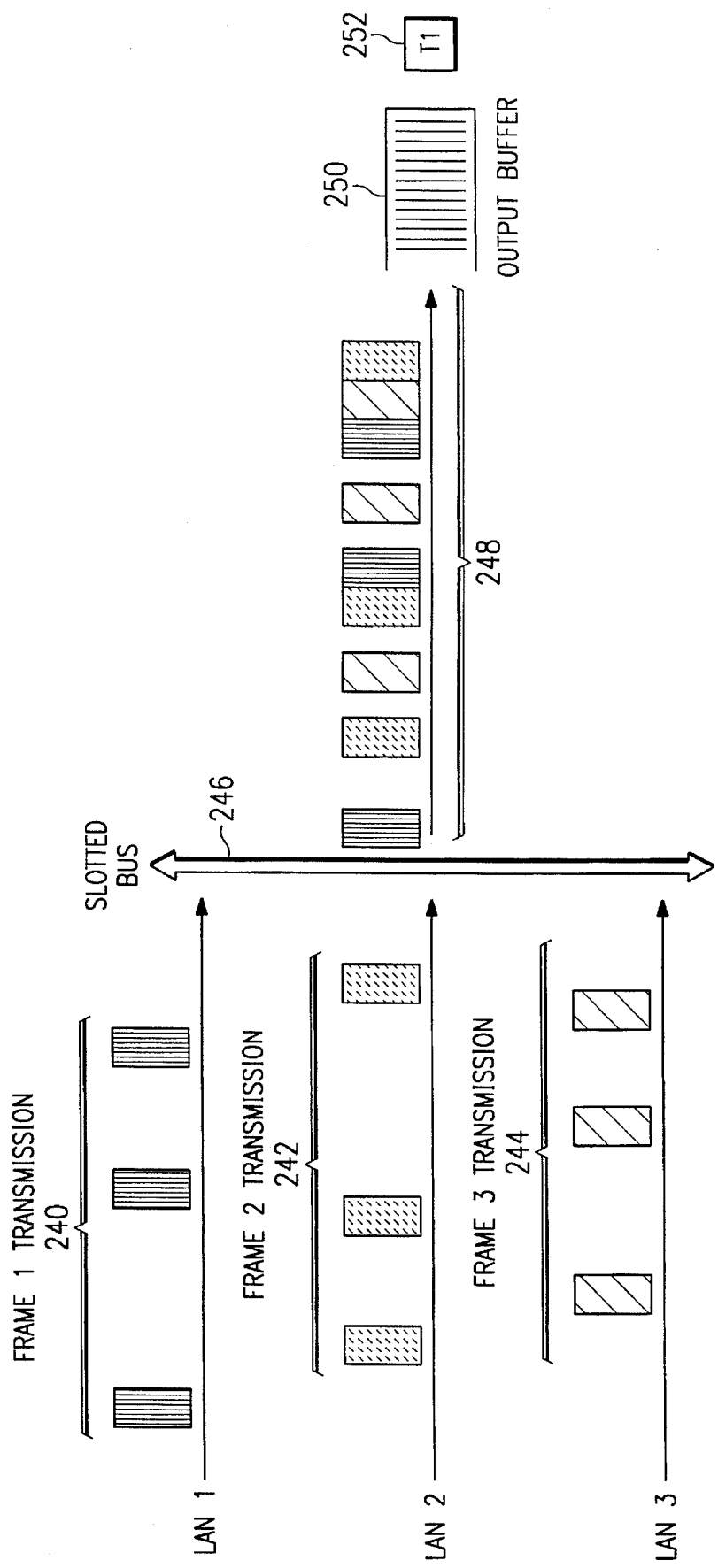
FIG. 7 illustrates congestion in an output buffer.

FIG. 7 illustrates congestion in an output buffer at the egress of the slotted bus 246, caused by simultaneously occurring frame bursts from different sources destined for the same output destination. In this example, a first local area network (LAN) 240, a second local area network (LAN) 242, and a third local area network (LAN) 244 are coupled to slotted bus 246. Egress packets 248 exiting the slotted bus 246 are provided to an output buffer 250. Output buffer 250 communicates to T1 network facility block 252.

Congestion due to transmission rate mismatches and the subsequent loss of data is a problem in the scenario illustrated in FIG. 7. In FIG. 7, multiple local area networks 240, 242 and 244, each supplying bursty traffic at a high peak rate, are connected to a single wide area T1 network facility block 252 of lower rate than the aggregate of the rates of local area networks 240, 242 and 244. The problem is compounded by the fact that frames are segmented into multiple time slots and transmitted across slotted bus 246 in discontinuous form shown as segmented packets 248. To simplify the transfer and reassembly of multiple frames from multiple sources, each contributing source transmits only one frame at a time. Thus, interleaving of frames at the source does not occur. Interleaving of frames at the destination buffer 250, however, does occur when two or more sources, such as local area networks 240, 242, and 244, transmit simultaneously towards the same destination.

Losses will occur if a source, such as a local area network, sends a frame across slotted bus 246 towards output buffer 250 when no buffer resources are available for the reassembly and posterior transmission of the frame. Losses may be reduced and reliability in the transfer of data across the bus may be improved by implementing some mechanism for controlling the data flow between sources and destinations. It is clear, for instance, that a T3 network facility loaded with bursty data could easily swamp a T1 network facility interface even if the average data rate is below 1.5 Mbps unless a throttling mechanism is in place. Two possible internal flow techniques may be used to alleviate this problem: (a) an addition of a sufficiently larger number of frame buffers in the output queue to accommodate the maximum burst sizes, or (b) a backpressure mechanism employing a backoff protocol whereby a congested egress output buffer 250 could communicate to its congesting ingress sources 240, 242, and 244 to temporarily halt or backoff on the amount of traffic being transmitted towards the congested output buffer 250.

Backoff Protocol

FIG. 8a illustrates a block diagram of a backoff protocol used in accordance with the teachings of the present invention. As shown in FIG. 8a, a packet bus overlay (PBO) source 200 communicates with a packet bus overlay (PBO) destination 202. Packet bus overlay source 200 includes an egress block 204 and an ingress block 206. Similarly, packet bus overlay destination 202 includes an egress block 208 and an ingress block 210.

Multiple packet bus overlay sources may contribute at any given time to the congestion experienced by packet bus overlay destination 202. In the example of FIG. 8a, only source 200 is shown for simplicity. The backoff procedure initiated by destination 202 is repeated for other congesting sources. When egress block 208 of packet bus overlay destination 202 becomes congested by a burst of asynchronous packet communications, a feedback or backoff procedure is initiated by packet bus overlay destination 202. The backoff procedure involves the exchange of explicit backoff messages from the congested packet bus overlay destination 202 to the congesting packet bus overlay source 200 and any other sources contributing to the congestion at destination 202. Backoff messages are transmitted using the expedite service over the system bus from congested packet bus overlay destination 202 to congesting packet bus overlay source 200. The backoff message requests the ceasing of the transmission of datagrams by the congesting packet bus overlay source 200 for a pre-determined period of time.

The backoff protocol affects only datagrams of the enabled backoff classes, for example, datagrams of specific classes of service. Transmission of datagrams of disabled classes are not affected by backoff periods. Conversely, disabled classes of service at the congested destination 202 will not invoke backoff messages.

At egress block 208 of packet bus overlay destination 202, a level of congestion above a specified backpressure level triggers the start of the backoff protocol. The scope of the backoff procedure includes datagrams of the enabled classes of service only.

As stated above, disabled classes of service do not participate in the backoff protocol.

The generation of an explicit backoff message is initiated by egress block 208 of congested packet bus overlay destination 202 upon reception of a user datagram 212 while egress block 208 is in this congested state. Egress block 208 of packet bus overlay destination 202, upon reception of datagram 212 of a backoff enabled class of service, issues a generate backoff signal 213 to its ingress block 210 as shown in FIG. 8a. The generate backoff signal 213 passes to ingress block 210 the following parameters: the address of the congesting packet bus overlay entity (address #1 in this example), obtained from the source address field of the incoming datagram, the address of the local entity obtained from the destination address field of the incoming datagram (address #2 in this example), and the bus selection from the source bus selector bit 5 octet ø in FIG. 6b of the incoming datagram. Upon receipt of the generate backoff signal 213 from egress block 208, ingress block 210 of packet bus overlay destination 202 generates a backoff message 214.

FIG. 8b illustrates a backoff message format according to the teachings of the present invention. As shown in FIG. 8b, the first octet 220 holds the payload type field, source bus selector A or B, expedite message indicator, and expedite message type which is 1110 meaning a backoff message. The next three octets hold the destination address 222. The next four octets comprise a don't care region 224 followed by the source address 226. A reserved octet 228 follows the source address 226. The maximum backoff time 230 is held in the 13th to 16th octets and is followed by a reserved region 232.

The destination address field 222 contains the address of the congesting packet bus overlay source, and the source address field 226 contains the address of the congested packet bus overlay destination. The maximum backoff time 230 is a 32 bit unsigned positive integer number representing the maximum number of system bus cycles that any congesting packet bus overlay entity has to backoff upon receipt of the backoff message. The actual backoff time is derived randomly from the maximum backoff time by each receiving packet bus overlay entity according to the method illustrated in FIG. 8c.

In FIG. 8a, the response to the receipt of backoff message 214 at packet bus overlay source 200 is to stop sending PBO datagrams of the enabled classes of service for some period of time. Egress block 204 of packet bus overlay source 200, upon reception of a backoff message 214, issues a received backoff signal 215 towards ingress block 206. The received backoff signal 215 passes to ingress block 206 of packet bus overlay source 200 the following parameters: a maximum backoff time and, optionally, the address of packet bus overlay destination 202 being congested, obtained from the source address field of backoff message 214. Upon receipt of the received backoff signal 215, ingress block 206 of packet bus overlay source 200 calculates a random actual backoff time according to the method illustrated in FIG. 8c. Ingress block 206 of packet bus overlay source 200 does not forward any datagrams of the backoff-enabled classes of service for a duration of time equal to the calculated backoff time. In the event of receiving subsequent backoff messages while still in the backoff mode, a new calculation of the backoff time and a new backoff time period is started. If an address is passed with the received backoff signal 215, the packet bus overlay source 200 calculates a random backoff time and starts the backoff time period, but optimally may continue normal transfer of requests from enabled class of service subqueues until the destination address of the datagram at the head of a subqueue matches the address passed with the backoff signal. At that time, transfers of requests from that subqueue are suspended until the end of the backoff time period. The ingress side 206 of packet bus overlay source 200 resumes normal transfer of datagrams at the end of the backoff time period whether the end is caused by the expiration of the period or by a forced termination resulting from a state of congestion being decided at the ingress block 206. This latter forced termination of the backoff period at the ingress side of the congesting sources prevents the backoff protocol from causing packet loss at the ingress side of the multi-service switch.

FIG. 8c illustrates probability density functions of backoff times according to one embodiment of the present invention. In this embodiment, two distinct calculations of the actual backoff time period are selectively used. The packet bus overlay layer management entity configures which one of the two is utilized for each congesting source 200. In one case, the ingress block derives an actual backoff time by the division of the maximum backoff time by a power of two, namely $2^n$, where n is a random value between 0 and N obtained by the ingress block from a random number generator. FIG. 8c illustrates the probability density function of backoff times derived in this manner as function A. In a second case, the ingress block derives an actual backoff time by subtracting the division of the maximum backoff time by the random power of 2, $2^n$, from the maximum backoff time. Therefore, the probability density function is illustrated in FIG. 8c as function B where n is a random value between 0 and N obtained by the ingress block from a random number generator.

To avoid frequent or long backoff time periods causing losses at the ingress side 206 queues, the ingress block of packet bus overlay entities forces a termination of any backoff period in progress when a severe congestion threshold is reached at the ingress side 206. When the input queue buffer occupancy reaches this congestion threshold, the packet bus overlay entity ignores the backoff enable/disable configuration status of the ingress block 206, thus forcing the termination of any backoff time period in progress. The normal backoff enable/disable status is reinstated when the ingress queues return to a non-congested state.

The multi-service switch 10 is equipped with extensive selective datagram discard procedures. These selective datagram discard procedures are executed by the packet bus overlay entities 155 managing the buffers that make the ingress block and egress block queuing systems 156. During periods of severe congestion, the queues in a packet bus overlay entity discard datagrams of selected classes of service in a controlled manner that favors discarding of datagrams of low priority classes of service over high priority classes. A variety of discard methods are available to the packet bus overlay entity. A first method is the forcible dequeuing of datagrams of selected classes of services from the head of the subqueues, freeing occupied buffers for use by arriving datagrams. The freed buffers are made immediately available for queuing of new packets of the same or higher loss priority. A second method is discarding datagrams of selected classes of service arriving at the queuing system rather than enqueuing them. A third is to discard datagrams of asynchronous transfer mode connections of selected classes of service if the asynchronous transfer mode cell they are carrying has the CLP bit set to a one. The final method is to discard incoming datagrams of any class of service if no more buffers are available. The selective packet bus overlay datagram discard procedures are common to both the ingress and the egress blocks of packet bus overlay entities 155a and 155b, respectively.

Wideband Bus Overlay

Figure 9A:
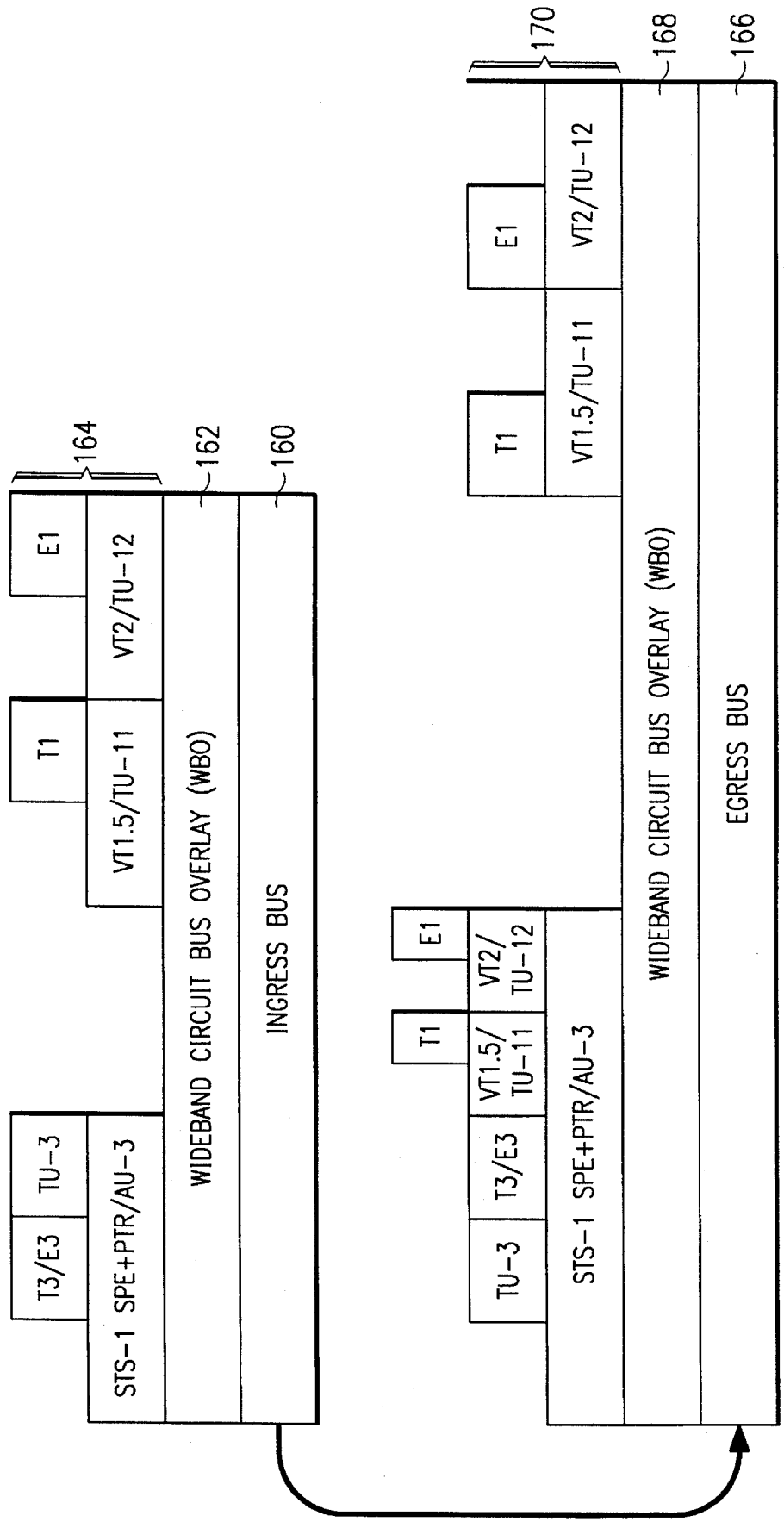
FIG. 9a illustrates a stack diagram of a wideband isochronous overlay according to the teachings of the present invention.

FIG. 9a illustrates a stack diagram of a wideband bus overlay according to the teachings of the present invention. Wideband services are defined as isochronous connections requiring T1/E1 bandwidth and greater. A SONET/SDH time division multiplexing (TDM) scheme overlayed onto isochronous time slots exclusively assigned to the wide band bus overlay may be used according to the present invention. The wideband bus overlay supports STS-1, TU-3, VT1.5 and VT2 multiplexing and crossconnect. This SONET/SDH format allows for transparent multiplexing and crossconnect of plesiochronous signals including T1, E1, T3 and E3 signals.

In FIG. 9a, a physical ingress bus 160 is overlaid by a wideband circuit bus overlay (WBO) 162. This wideband bus overlay supports three basic data structures which in turn support five other data structures as shown in stacks 164. The three basic data structures are STS-1 SPE+PTR, VT1.5 and V2 as shown. Support of these three basic structures enables the multi-service switch of the present invention to process all North American and European PDH datatypes, with the exception of E4. All isochronous wideband interfaces are adaptable and map payloads into these structures for access to the isochronous wideband bus overlay 168. FIG. 9a shows that T3/E3 and TU-3 formats are adapted into the STS-1/SPE format. Similarly T1 is adapted into the VT1.5 format and E1 is adapted into the VT2 format.

Egress bus 166 is overlaid by wideband circuit bus overlay 168. Wideband bus overlay 162 and wideband bus overlay 168 are bridged and both support the three basic data formats STS-1 SPE+PTR, VT1.5 and VT2. Wideband circuit bus overlay 168 supports the basic data structures and other data formats as shown in stacks 170. As shown in FIG. 9a, the wideband circuit bus overlay of the present invention supports Plesiochronous Digital Hierarchy (PDH), Synchronous Digital Hierarchy (SDH) and SONET datatypes including T1, E1, E3, asynchronous T3, STS-1, OC-3 and STM-1.

The amount of bandwidth allocated to the wideband bus overlay is variable. Bandwidth requirements range from 27 octets, which is less than one slot, for a VT1.5 format to 786 octets, which is over 12 time slots, for an STS-1 SPE plus pointer (STS-1 SPE+PTR) format. Efficient use of bandwidth is maintained by treating isochronous bandwidth reserved for wideband formats as one continuous resource pool, addressable at the octet level. In this way, VTn (VT1.5 or VT2) circuits are allocated across time slot boundaries. For STS-1 and TU-3 circuits, the system of the present invention allocates an integer number of time slots per circuit. An STS-1 requires 786 bytes and is assigned 13 slots or 832 bytes. This reservation method allows for quick release of bandwidth for asynchronous services when STS-1/TU-3 services are removed. Data from a T1/E1 interface is placed onto the ingress bus in a VT format. Each interface is provided with an egress STS-1/TU-3 pointer processor and a VT mapper/demapper which performs the translation between T1/E1 and VT1.5/VT2 respectively. Data from a SONET/SDH or T3/E3 interface is placed onto the ingress bus in an STS-1/TU-3 format which includes SPE/VC pointer information from plesiochronous synchronization. Each interface is programmed with an egress time slot interchange (TSI) which determines which VT's are to be sourced from the egress bus, and in what order the VT's are to be mapped into an outgoing STS-1/TU-3 or T3/E3.

WBO Payload Envelope

Figure 9B:
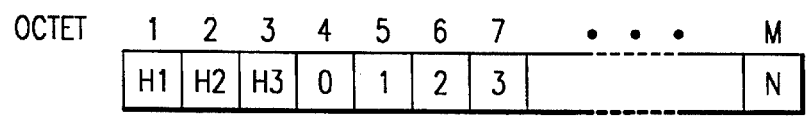
FIG. 9b illustrates a diagram of a wideband overlay payload envelope according to the teachings of the present invention.

FIG. 9b illustrates a payload envelope for the wideband bus overlay. The Wideband Bus Overlay (WBO) provides transparent transport of plesiochronous data streams through implementation of a payload envelope and pointer structure providing octet justification and synchronous payload tracking similar to SONET/SDH structures. The octet number 1 to M represents the number and time division order of isochronous octets reserved for a WBO payload envelope. The first two octets (H1 and H2) are located at the beginning of the envelope and contain 6 pointer control bits and a 10-bit pointer value from 0 to N used to identify the first octet of a payload frame where location 0 is the first octet of the payload container and location N is the last octet of the payload container. The third payload envelope octet location (H3) is used as a place holder for data during a negative justification process. Justification, pointer movements and pointer contents follow rules described in TR-NWT-000253 and CCITT ERecommendation G.709 for efficient mapping of SONET/SDH structures. The remaining octets form a container for plesiochronous data. This container may be any size required to encapsulate one 125 μs frame of plesiochronous data up to 1024 octets. The system of the present invention uses the WBO payload envelope to transport the STS-1 SPE+PTR data format. In one embodiment of the present invention, the pointer value indicates the first octet of path overhead (J1) of the STS-1 SPE.

Adaptation of STS-1SPE

Figure 9C:
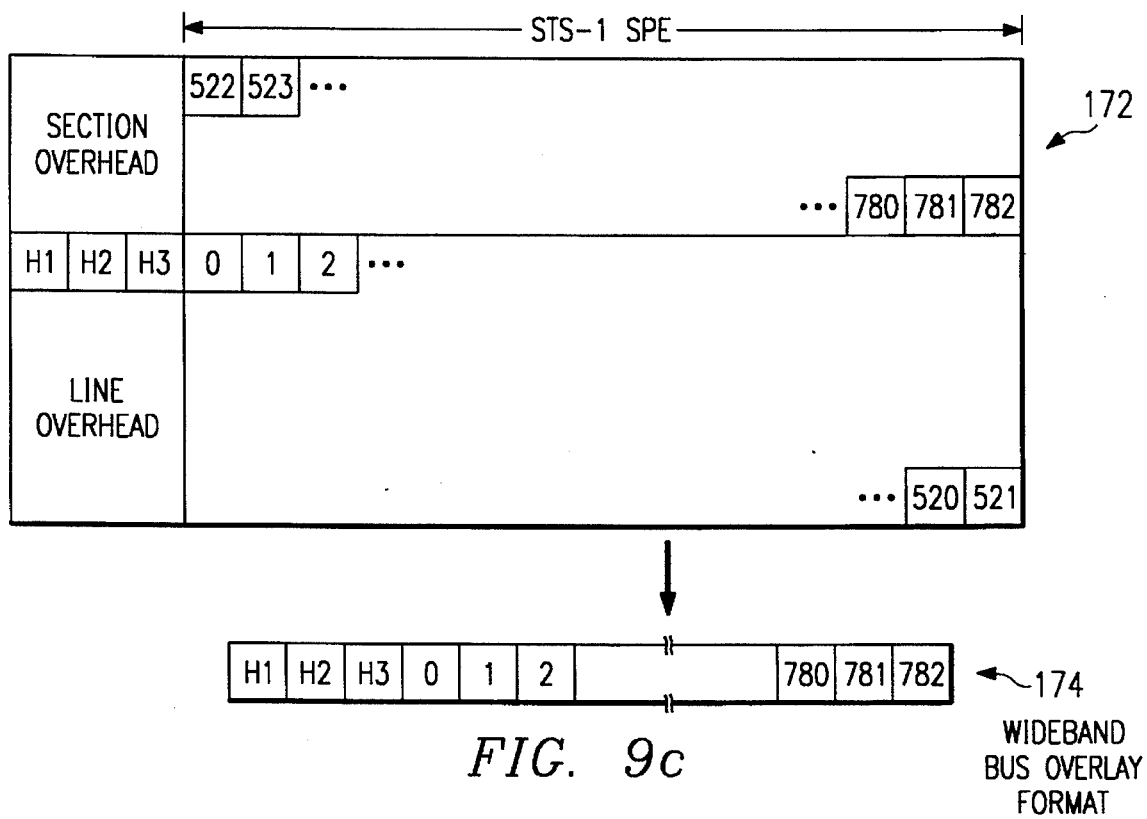
FIG. 9c illustrates adaption of a STS-1 Synchronous Payload Envelope (SPE) to an isochronous wideband bus overlay data format according to the teachings of the present invention.

FIG. 9c illustrates adaptation of STS-1 Synchronous Payload Envelope (SPE) to a wideband bus overlay format according to the teachings of the present invention. SONET/STS-1/SPE format 172 is transformed to wideband bus overlay format 174 as shown. The illustration of FIG. 9c shows the adaptation of a SONET/STS-1/SPE to the isochronous wideband bus overlay of the present invention. After terminating the line, section and STS-1 path overhead, each individual STS-1SPE plus H1, H2 and H3 bytes (786 bytes) is output to the ingress bus mapper. Bytes H1 and H2 contain the pointer value between 0 and 782 that tracks the position of the first byte of the SPE path overhead relative to the first byte following H3. H3 is used to carry the extra SPE byte in the event of a negative justification. SPE pointer processing and justification are continuous real time processes implemented in hardware. The STS-1/SPE supports mappings including single DS3 or multiple VTG's.

Adaptation of TU-3

Figure 9D:
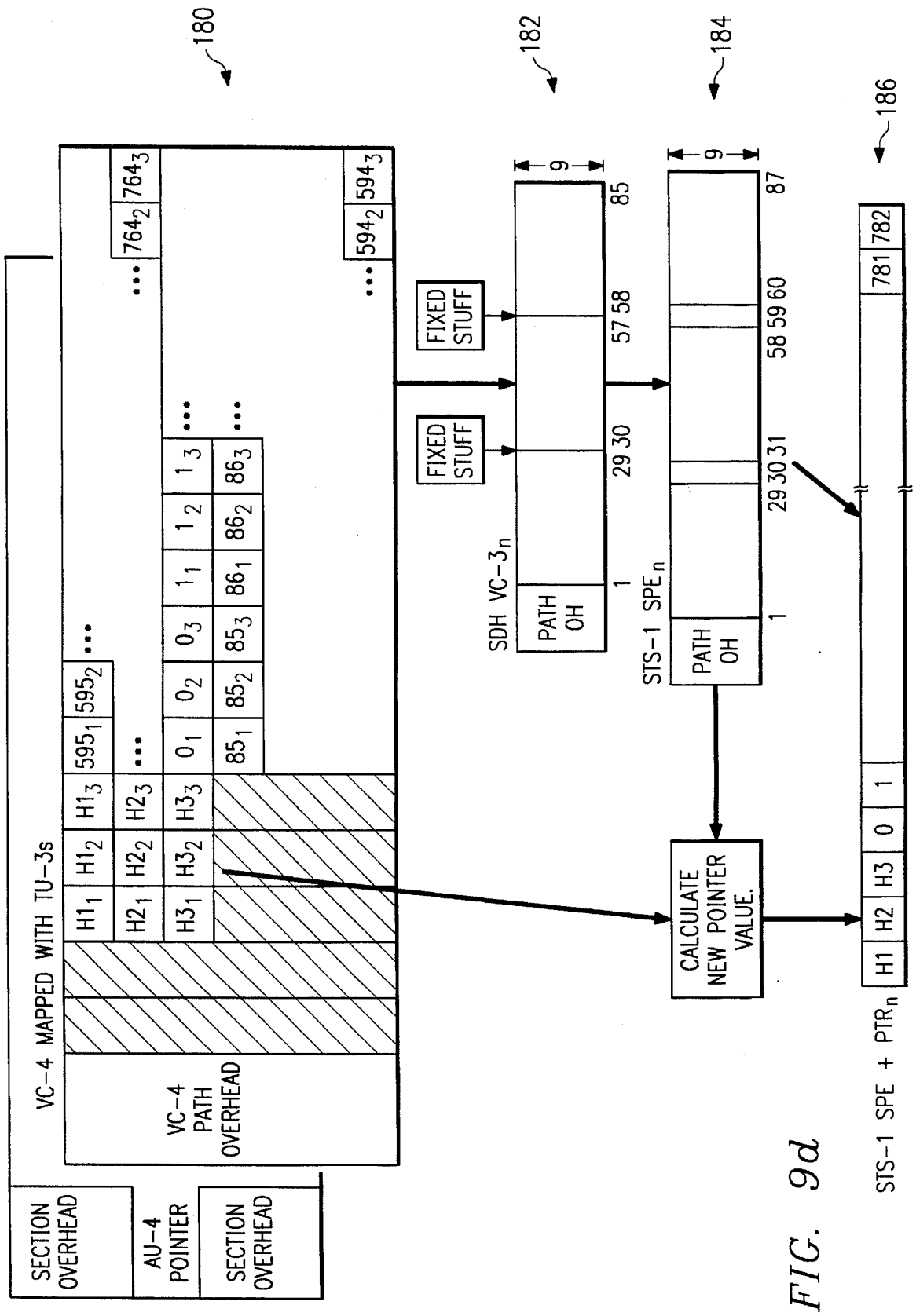
FIG. 9d illustrates adaption of a TU-3 to an isochronous wideband bus overlay data format according to the teachings of the present invention.

FIG. 9d illustrates adaptation of TU-3's extracted from a VC-4 structure to a wideband bus overlay format according to the teachings of the present invention. As shown in FIG. 9d, after terminating the line, section, VC-4 path overhead (if present) and VC-3 path overhead, each SDH/VC-3 182 extracted from a SDH/VC-4 mapped with TU-3's 180 is converted to an STS-1 SPE 184 by adding two columns of fixed stuff as shown. At this point, each TU-3 resembles and STS-1 SPE. Concurrently, each TU-3's associated pointer octets are adjusted to compensate for changes to the payload during the addition of fixed stuff. The assembled STS-1 SPE 184 and new pointer octets are then multiplexed into an STS-1 SPE+PTR 186 structure for transport across the wideband bus overlay.

VC-3 Conversion and E1/T1 Adaptation

An SDH/VC-3 is converted to a SONET SPE payload by inserting a stuff column between columns 29 and 30 and a stuff column between columns 57 and 58 as shown in FIG. 9d. Crossconnect of E1's/T1's and multiplexing of E1's/T1's to higher order aggregates, M13 or SONET multiplexing, makes use of the wideband bus overlay. A T1 interfacing to the wideband bus overlay is adapted to a VT1.5. An E1 interfacing to the wideband bus overlay is adapted to a VT2. T1's/E1's destined for M13 multiplexers or asynchronous crossconnect use an asynchronous or bit synchronous VT mapping. This restriction is required to meet DSx jitter requirements. T1's/E1's destined for SONET interfaces use the VT mapping appropriate for the end destination.

Aggregate Interfacing and Pointer Processing

Some signal conditioning must occur in order to interface with the templates described above. An aggregate is a T3, E3, OC-3 or STM-1. Although the term aggregate implies that these structures contain multiplex T1/E1 streams, these interfaces can be treated as virtual channels with any data content.

The SONET/SDH aggregates use pointers and byte justification at each stage of multiplexing to adapt plesiochronous payloads into synchronous envelopes. The SONET/SDH aggregate interface of the present invention processes all pointers associated with SPE, AU-x and TU-3 envelopes to track payload framing from the network as well as perform justification and pointer adjustment to adapt payloads to the network. One pointer method is used for all pointers. Pointer processing and justification are continuous real time processes implemented in hardware.

A SONET interface contains a two byte pointer and one justification byte per STS-1. The pointer tracks the first byte of the SPE path overhead (J1) and indicates positive or negative justification occurrence. A SONET OC-3 interface processes three independent SPE pointers per direction.

An SDH/STM-1 aggregate can contain one AU pointer associated with three justification bytes and up to three TU pointers associated with one justification byte each—up to four pointers per direction.

An AU-4 pointer tracks the first VC-4 path overhead byte (J1) and indicates positive or negative justification occurrence. Justification occurs in three byte steps. An SDH/STM-1 interface provisioned for AU-4 mapping processes one AU-4 pointer per direction to locate the AU-4 path overhead and imbedded TU pointers.

An SDH/STM-1 mapped for AU-3 operation is the same as a SONET OC-3. An SDH interface operating in this mode processes a two byte pointer and one justification byte per TU-3. The pointer tracks the first byte of the TU-3 path overhead (J1) and indicates positive or negative justification occurrence. An SDH interface operating in this mode processes three independent pointers per direction.

A TU-3 pointer tracks the first VC-3 path overhead byte (J1) and indicates positive or negative justification occurrence. Justification occurs in one byte steps. An SDH/STM-1 interface provisioned for TU-3 mapping processes three individual TU-3 pointers per direction to frame each VC-3.

Some signal conditioning occurs on the tributary interface in order to interface with the slotted bus of the present invention. A tributary is a T1 or E1. T1's are mapped into VT1.5's. E1s are mapped into VT2's.

A tributary interface provides the mechanism for identifying VT's within the SPE/VC. For each tributary terminated by the interface, the SPE/VC envelope first is identified and the pointer processed to determine the alignment of the SPE/VC. Once the alignment of the SPE/VC is determined, the position of any VT can be calculated with a hierarchial count structure.

SONET/SDH virtual tributaries use pointers and byte justification to adapt plesiochronous payloads into synchronous envelopes with a similar mechanism to that used in the aggregate interface. The SONET/SDH tributary interface of the present invention process a single pointer per direction associated with each connected VT to track payload framing from the network as well as perform justification and pointer adjustment to adapt payloads to the network. As discussed above, one pointer algorithm is used for all pointers. VT pointer processing and justification are continuous real time processes implemented in hardware.

T1 and E1 trunks must be adapted to a SONET VT format before they can be routed to the system bus. Adaptation includes mapping of Channel Associated Signaling (CAS) into one byte field, sub-frame tagging, pointer processing, and byte or bit justification depending on VT mode: locked, byte synchronous/floating, bit synchronous/floating or asynchronous. Each tributary VT is managed as a separate logical element on the isochronous wideband bus overlay.

An elastic buffer is utilized per tributary to absorb waiting time jitter, clock jitter and wander and pointer movements. Since channel alignment is not important for trunk to trunk crossconnect, this buffer may be less than one frame deep assuming that jitter, wander and pointer movements amount to less than one frame of phase jitter peak to peak.

Narrowband Bus Overlay

FIG. 10a illustrates a narrowband bus overlay data structure for isochronous T1 and E1 traffic carrying data and/or uncompressed PCM voice. The narrowband bus overlay allows the present invention to support transport of circuit-switched Time-Division-Multiplexed data/voice with a granularity of 64 kbps and minimal delay.

T1 Narrowband Bus Overlay (data/uncompressed voice)

Incoming T1 signals received by interface modules $28_1$ to $28_n$ are formatted according to the format in FIG. 10a. As shown in FIG. 10a, the first octet of the T1 overlay structure includes four signaling bits Sa, Sb, Sc, and Sd, and a framing bit F. The following 24 octets carry T1 timeslots 1–24 as shown, and can contain a mixture of data and 64 kbps uncompressed voice. The signaling bits are used in conjunction with uncompressed voice traffic carried on some or all of T1 timeslots 1–24, and are typically not used for data traffic. There are two (T1 D4 framing) or four (T1 ESF framing) signaling bits allocated for each voice channel on the T1 link. These bits carry call processing information, and are extracted from the T1 link by the isochronous interface card and placed into the T1 overlay structure. The framing bit F is used only for transparent T1 operation, where the entire T1 frame is placed into the overlay structure intact as received from a T1 link. In this mode, the T1 framing bit from each received frame is placed in the F bit position of the T1 structure. S-Signaling bits are not required, since the original T1 multiframe, imbedded within the framing bits, is preserved. The T1 structure is placed within a 64-octet timeslot on the slotted bus that has been designated as an isochronous timeslot as previously described, with up to two overlays per slot. For redundancy, both slotted buses are driven simultaneously with identical information. A T1 structure may be overlaid within an isochronous timeslot such that octet 0 of the T1 structure corresponds with either octet 0 or octet 32 of the bus timeslot. Since the T1 structure is only 25 octets long, octets 25 through 31 and 57 through 63 of the isochronous bus timeslot are unused by the T1 overlay.

E1 Narrowband Bus Overlay (data/uncompressed voice)

Incoming E1 signals received by interface modules $28_1$ to $28_n$ are formatted according to the E1 structure format of FIG. 10a. As shown in FIG. 10a, the first octet of the E1 overlay structure contains two sets of four signaling bits Sa, Sb, Sc, and Sd. These signaling bits are in the same format as received in timeslot 16 of the E1 link. The remaining 31 octets contain E1 timeslots 0–15 and 17–31. The E1 timeslots can contain a mixture of data and 64 kbps uncompressed voice. The signaling bits are used in conjunction with uncompressed voice traffic carried on some or all of channels 1–15 and 17–31, and are typically not used for data traffic. There are four signaling bits associated with each voice channel on the E1 link. These bits carry call processing information, and are extracted from the E1 link by the E1 isochronous interface card and placed into the E1 overlay structure. E1 timeslot 0 is reserved for framing and E1 alarm information, and is unavailable for transport of 64 kbps voice/data. E1 timeslot 0 does, however, contain some unused bandwidth which may contain user traffic. For this reason, timeslot ∅ is placed into the E1 structure as received by the E1 interface module. The E1 structure is placed within a 64-octet timeslot on the slotted bus that has been designated as an isochronous timeslot as previously described, with up to two E1 overlays per bus timeslot. For redundancy, both slotted buses are driven simultaneously with identical information. An E1 structure may be overlaid within an isochronous bus timeslot such that octet 0 of the E1 structure corresponds with either octet 0 or octet 32 of the bus timeslot. Since the E1 structure is 32 octets long, the structure leaves no unused information within the isochronous bus timeslot.

Signaling Multiframe Structure

In the T1 and E1 overlays described above, each signaling octet contains signaling information for 1(T1) or 2(E1) channels. The system multiframe structure provides a method of determining the T1 or E1 timeslot for which each signaling octet is associated. The T1 and E1 links each contain a multiframe structure, separate from the system multiframe, for the purpose of extracting signaling information from the link. The T1 multiframe is either 12(D4 framing) or 24(ESF framing) T1 frames long. The E1 multiframe is 16 E1 frames long. The least common denominator for these multiframe lengths is 48 frames, thus a 48-frame system multiframe is utilized to identify signaling information. The 48-frame length allows for one common system multiframe to support all incoming multiframe lengths, with an integer number of incoming T1/E1 multiframes per system multiframe.

Received signaling information is placed in an ingress signaling buffer on the T1 or E1 interface card, and is read out during overlay formatting according to the system multiframe number in which the overlay is to be sent on the slotted bus. A system multiframe synchronization signal is generated by the head of bus control 12 and 20, and is bussed to all physical chassis slots. This signal, occurring every 6 msec, is used to synchronize the multiframe channel counters on each isochronous interface card. The channel counters are used to keep track of the current system multiframe channel, making it possible to associate each signaling octet within the T1 or E1 overlays to its corresponding voice channel on an outbound link. For example, referring to FIG. 10b for a T1 interface, if an overlay is formatted for transmit on the ingress bus during multiframe channel 16, signaling information for T1 timeslot 16 is read from the signaling buffer and placed in the first byte of the overlay, along with the received framing bit. Within the 48-frame system multiframe, signaling for four D4-framed T1 multiframes, two ESF-framed T1 multiframes, or three E1 multiframes may be carried.

FIG. 10b illustrates the system multiframe structure for trunks carrying 64 kbps uncompressed voice. For D4-framed T1 trunks, only two signaling bits (a and b) are supported per channel. Each signaling octet within the T1 overlay carries two sets of signaling bit pairs, received in successive multiframes from the incoming D4 T1 stream. For example, referring to FIG. 10b, system multiframe channel 1 contains four signaling bits for a D4-framed T1 link. Bits $a_{1a}$ and $b_{1a}$ contain the a and b signaling bits received within a T1 multiframe for channel 1 on the T1 link, and bits $a_{1b}$ and $b_{1b}$ contain the a and b signaling bits received for channel 1 on the following T1 multiframe. Thus, for D4-framed T1 trunks, each signaling octet carries signaling received for a particular T1 channel on two successive T1 multiframes. For ESF-framed T1 trunks, four signaling bits (a, b, c, and d) are supported per channel. In this mode, each signaling octet carries signaling received for a particular channel on one ESF T1 multiframe.

E1 trunks support four signaling bits per channel, and these bits are carried in pairs within Timeslot 16 on the E1 link. This structure is preserved within the system multiframe, as shown in FIG. 10b, where each signaling octet in the E1 overlay contains signaling information for two E1 timeslots. The E1 multiframe alignment signal, which determines the beginning of the E1 multiframe and carries alarm information, is also carried within the E1 overlay.

Narrowband Bus Overlay for Compressed Voice

Using various voice compression techniques, between two and eight voice conversations may be carried over a single 64 kbps timeslot on a T1 or E1 link. Extra bandwidth must be provided within the narrowband overlay to allow transport of the signaling information required for each channel. Adding signaling octets to the uncompressed narrowband overlays previously described (shown in FIG. 10a) provides the necessary extra bandwidth. FIG. 10c illustrates the narrowband bus overlay structure for trunks containing compressed voice. These structures are identical to those shown in FIG. 10a, except for three additional signaling octets provided at the top of the structures. The number of signaling octets needed is variable depending on the number of compressed voice channels carried within each T1 or E1 timeslot. FIG. 10d illustrates the number of signaling octets needed for various compression schemes. As shown, the number of signaling octets changes from one to four as the compression type changes from 32 kbps to 8 kbps. The compressed signaling overlay for T1 provides for carrying four signaling bits per voice channel, while the E1 overlay allows two bits per channel. Note that four signaling bits per voice channel can be supported for E1 by adding more octets to the overlay, but no standard currently exists for transport of more than two signaling bits per channel over E1.

FIG. 10e illustrates mapping of compressed-channel signaling to the system multiframe according to the teachings of the present invention. For example, during frame 2 of the system multiframe, signaling for timeslot 2 on T1 links, and for timeslots 1 and 2 on E1 links, is carried within the narrowband overlay on isochronous system slots. For each timeslot number shown in FIG. 10e, there is associated one to four signaling octets within the overlay, depending on the compression type used. Signaling bit mapping for E1 links supporting the CCITT G.761 signaling protocol is also shown in FIG. 8e. The G.761 protocol is applicable to 32 kbps voice compression only, and thus takes up one signaling octet in the E1 overlay.

Narrowband Bus Bandwidth Utilization

Bus bandwidth is allocated to narrowband interfaces by reserving 64-octet timeslots on the slotted bus for isochronous traffic. Each bus timeslot may carry data and signaling for up to two T1 or E1 trunks. At the bus ingress side of each isochronous interface card, data is received from the attached T1 or E1 link and formatted according to the narrowband overlays previously described. The interface is programmed with the bus timeslot number that has been allocated for its data, and the received data is placed on the ingress bus within the allocated timeslot for every system frame. For bus egress, a timeslot interchange method is used to allow remapping of information received from the egress bus into the outbound timeslots of the T1 or E1 link. This method allows the egress hardware to be programmed with a cross-connect mapping to determine when to receive data from the egress bus. By programming the egress hardware with the timeslot number and octet number to receive from the slotted bus for each outbound T1 or E1 timeslot, information from any inbound T1 or E1 timeslot in the system may be transmitted on any outbound T1/E1 timeslot, implementing a fully non-blocking 64 Kbit/second timeslot interchange. Broadcasting of information from one received T1/E1 timeslot to multiple outbound T1/E1 timeslots is accomplished by programming the egress time slot map of multiple interface cards, or multiple T1/E1 timeslots within a single egress interface, to receive the same timeslot from the egress bus.

Summary and Overview

A multi-service switch for telecommunications networks constructed according to the teachings of the present invention provides a number of advantages.

One technical advantage is the building of three unique bus overlays on the same physical bus configured to service three different types of telecommunications services.

A further technical advantage is the ability to change dynamically allocations of time slots on the bus between isochronous and asynchronous services without a disruption of existing traffic on the system.

A further technical advantage of the present invention is the transformation of one data format to another data format inside a server module allowing interworking between many different types of telecommunications services within a single service platform.

Another technical advantage of the present invention is the unique format for each overlay and independent operation although the overlays share the same bus.

Another technical advantage of the present invention is that the multi-service switch for telecommunications network of the present invention allows the transformation of all telecommunications information into one of a plurality of formats which are transmitted on a single physical system bus.

Another advantage of the present invention is that the control of all the hardware modules uses the same packet bus overlay as the user information without requiring additional hardware.

Another advantage of the present invention is its reliable operation due to the use of redundant buses with automatic switchover after a failure.

Although the present invention has been described in detail, it should be understood that various changes, substitutions, and alterations can be made hereto without departing from the spirit and scope of the invention as defined by the appended claims.

What is claimed is:

1. A packet bus overlay datagram format, comprising:
   an internal datagram header comprising a destination address, a weighted age, and a source address, wherein the weighted age includes an age of the datagram and a weighting factor associated with the datagram; and
   a datagram payload concatenated with the internal datagram header comprising payload data.

2. The packet bus overlay datagram format of claim 1, wherein the internal datagram header comprises eleven octets of data.

3. The packet bus overlay datagram format of claim 1, wherein the datagram payload comprises fifty-three octets of data.

4. The packet bus overlay datagram format of claim 3, wherein the datagram payload comprises fifty-three octets of data representing information held in one asynchronous transfer mode cell.

5. A wideband bus overlay data format, comprising;
   a first header octet;
   a second header octet concatenated with the first header octet;
   a third header octet concatenated with the second header octet, and
   a plurality of payload octets concatenated with the third header octet such that data formatted in one of a plurality of isochronous wideband data formats is adaptable to the wideband bus overlay data format.

6. The wideband bus overlay data format of claim 5, wherein the plurality of payload octets comprises seven hundred eighty three octets, and the one of a plurality of isochronous wideband data formats comprises an STS-1 synchronous payload envelope.

7. The wideband bus overlay data format of claim 5, wherein the plurality of payload octets comprises seven hundred eighty three octets, and the one of a plurality of isochronous wideband data formats comprises a TU-3.

8. A narrowband bus overlay data format, comprising;
   a first plurality of octets operable to hold data representing a plurality of signaling bits;
   a second plurality of octets concatenated with the first plurality of octets operable to hold data representing transmitted information such that a plurality of isochronous narrowband data formats are adaptable to the narrowband bus overlay data format; and
   a common system multiframe structure containing at least one of the first plurality of octets and one of the second plurality of octets wherein the common system multiframe system is of a fixed length and supports a plurality of isochronous narrowband data formats.

9. The narrowband bus overlay data format of claim 8, wherein the plurality of isochronous narrowband data formats comprises a T1 structure and an E1 structure.

* * * * *